(12) United States Patent
Kagotani et al.

(10) Patent No.: US 10,895,672 B2
(45) Date of Patent: Jan. 19, 2021

(54) OPTICAL ELEMENT, OPTICAL ELEMENT DEVICE AND OPTICAL ELEMENT CONTROL SYSTEM

(71) Applicant: TOPPAN PRINTING CO., LTD., Tokyo (JP)

(72) Inventors: Akihito Kagotani, Tokyo (JP); Soko Koda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 297 days.

(21) Appl. No.: 15/938,859

(22) Filed: Mar. 28, 2018

(65) Prior Publication Data

US 2018/0217307 A1 Aug. 2, 2018

Related U.S. Application Data

(63) Continuation of application No. PCT/JP2016/080588, filed on Oct. 14, 2016.

(30) Foreign Application Priority Data

Oct. 16, 2015 (JP) .................. 2015-204744

(51) Int. Cl.
| | |
|---|---|
| *G02B 5/18* | (2006.01) |
| *G02B 5/32* | (2006.01) |
| *G02B 27/22* | (2018.01) |
| *G09F 19/14* | (2006.01) |
| *G03B 21/62* | (2014.01) |
| *G02B 30/00* | (2020.01) |
| *G02B 30/26* | (2020.01) |

(52) U.S. Cl.
CPC ............. *G02B 5/1876* (2013.01); *G02B 5/32* (2013.01); *G02B 30/00* (2020.01); *G02B 30/26* (2020.01); *G03B 21/62* (2013.01); *G09F 19/14* (2013.01); *G02B 5/1814* (2013.01)

(58) Field of Classification Search
CPC ...... G02B 5/18; G02B 5/1876; G02B 5/1814; G02B 5/32; G02B 26/02; G02B 27/22; G02B 30/26; G02B 30/00; G09F 19/14; G09F 19/12; G09F 19/1922; G09F 9/37; G09F 9/00; G09F 9/30; G09F 7/16; G03B 21/62; G03B 21/60
USPC ................. 359/569, 459, 467, 469, 449, 443
See application file for complete search history.

(56) References Cited

U.S. PATENT DOCUMENTS

| | | |
|---|---|---|
| 4,282,669 A | 8/1981 | Rieumont |
| 8,223,196 B2 | 7/2012 | Carter et al. |
| (Continued) | | |

FOREIGN PATENT DOCUMENTS

| | | |
|---|---|---|
| FR | 2053685 A5 | 4/1971 |
| JP | 52-146592 A | 12/1977 |
| (Continued) | | |

OTHER PUBLICATIONS

Extended European Search Report dated Sep. 26, 2018 in corresponding application No. 16855542.3.

(Continued)

*Primary Examiner* — Jie Lei
(74) *Attorney, Agent, or Firm* — Foley & Lardner LLP

(57) ABSTRACT

The optical element has transmissivity in a first direction, and includes a plurality of first members each having a first surface that forms an element of first information. The first surface faces a second direction orthogonal to the first direction.

11 Claims, 30 Drawing Sheets

(56) References Cited

U.S. PATENT DOCUMENTS

2009/0046361 A1  2/2009  Itoh et al.
2011/0038030 A1  2/2011  Roosendaal et al.

FOREIGN PATENT DOCUMENTS

JP       S61-58215 U     4/1986
WO   WO-2013/099081 A1   7/2013

OTHER PUBLICATIONS

International Search Report with English translation and Written Opinion issued in International Application No. PCT/JP2016/080588 dated Jan. 17, 2017.

ELEMENT GROUP OF FIRST INFORMATION

ELEMENT GROUP OF SECOND INFORMATION

ELEMENT GROUP OF THIRD INFORMATION

ELEMENT GROUP OF FOURTH INFORMATION

A1 DEVELOPED VIEW

B1 DEVELOPED VIEW

C1 DEVELOPED VIEW

D1 DEVELOPED VIEW

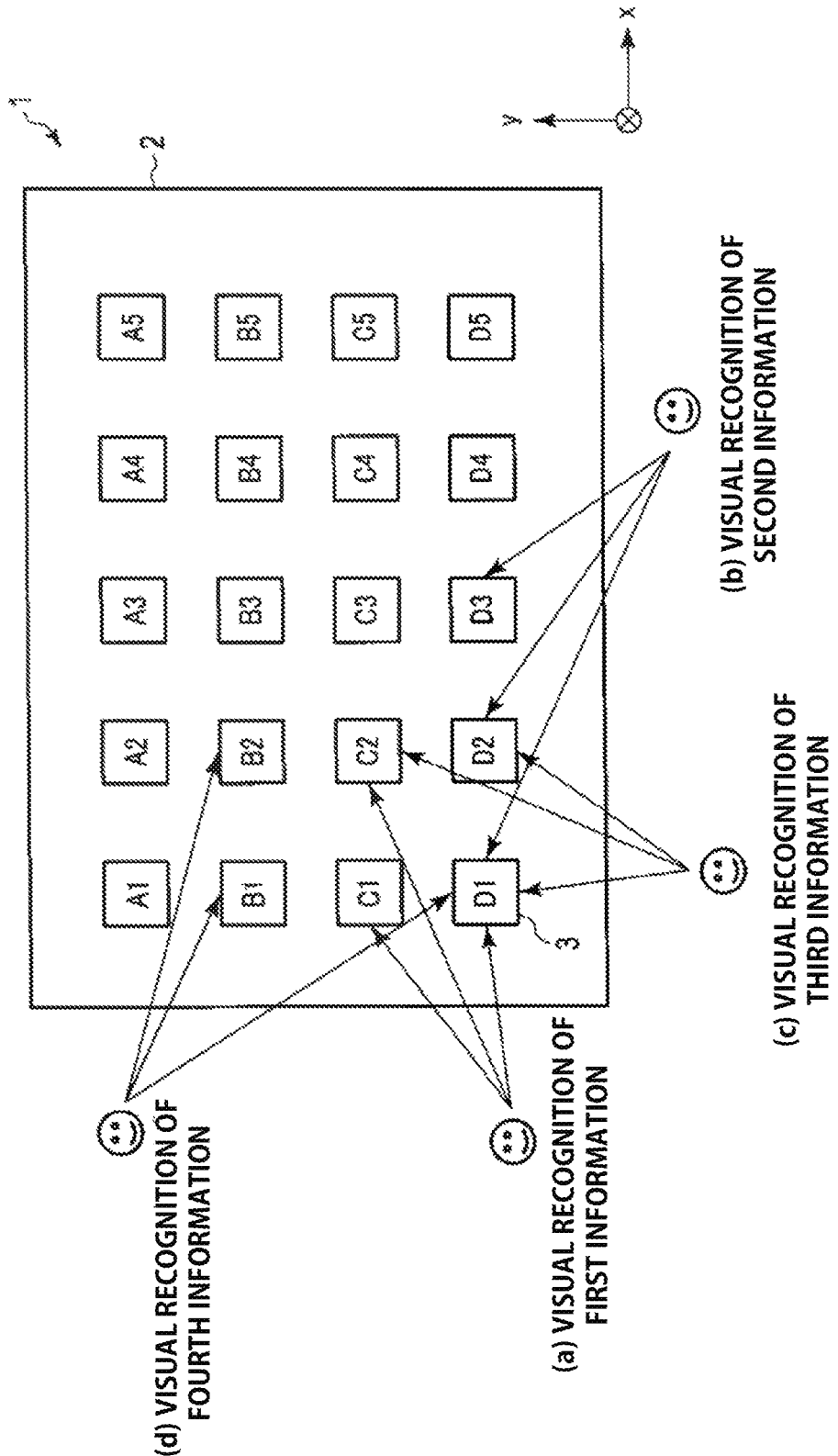

OPTICAL ELEMENT, OPTICAL ELEMENT DEVICE AND OPTICAL ELEMENT CONTROL SYSTEM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/080588, filed on Oct. 14, 2016, which is based upon and claims the benefit of priority of Japanese Patent Application No. 2015-204744, filed on Oct. 16, 2015, the entireties of which are hereby incorporated by reference.

TECHNICAL FIELD

The present invention relates to a transmission-type optical element that can obtain information simultaneously with visual recognition of an object visible through the optical element, and also relates to an optical element device and an optical element control system.

BACKGROUND ART

Many transmission-type devices have been developed in recent years. One transmission-type device is a head mounted display. PTL 1 described below discloses a head mounted display technology. A head mounted display displays information on a transmission-type display. The observer can simultaneously see information transmitted through the head mounted display and information displayed on the head mounted display.

One transmission-type device is a device relating to projection mapping. PTL 2 described below discloses a projection mapping technology. Projection mapping is a technology that projects videos by a projector on the surface of an actual structure. The observer can simultaneously see information related to the structure and information from the projector.

CITATION LIST

[Patent Literature] PTL 1: WO 2013/099081 A; PTL 2: U.S. Pat. No. 8,223,196 B

SUMMARY OF THE INVENTION

Technical Problem

However, due to its characteristics, the head mounted display is required to be attached to an individual observer when in use. Therefore, it is difficult for a plurality of observers to share the same information. Furthermore, when information is displayed on the head mounted display, it is difficult for the observer to see information that is visible through the head mounted display. In order to increase the visibility of the information is visible through the head mounted display, it is necessary to reduce the visibility of the information displayed on the head mounted display. Thus, which information is prioritized is a matter of trade-off.

Moreover, since projection mapping directly projects videos on a structure, the information related to the structure and the projected information are mixed. Accordingly, it is difficult for observers to separately grasp the information related to the structure and the projected information.

The present invention has been made in consideration of these problems, and an object of the present invention is to provide an optical element that can simultaneously provide external information visible through the optical element and information different from the external information, and also to provide an optical element device and an optical element control system.

Solution to Problem

The optical element according to the present invention has transmissivity in a first direction, and includes a plurality of first members each having a first surface that forms an element of first information. The first surface faces a second direction orthogonal to the first direction.

The optical element device according to the present invention includes a first optical element and a second optical element, i.e., a plurality of optical elements, each corresponding to the above optical element.

The optical element control system according to the present invention includes the above optical element, a transfer mechanism for transferring the optical element, and a control unit for controlling the transfer of the optical element by the transfer mechanism in synchronization with a video on the first surface.

Advantageous Effects of the Invention

The optical element according to the present invention can simultaneously provide external information visible through the optical element and information different from the external information. The observer can thereby see information transmitted through the optical element by viewing the optical element along the first direction. Further, the observer can simultaneously see the information transmitted through the optical element and information provided by the optical element by viewing the optical element along a direction across the first direction.

The optical element device according to the present invention can provide information formed by each of a plurality of optical elements. The observer can thereby simultaneously see information provided by each of the plurality of optical elements by viewing the plurality of optical elements along a direction across the first direction.

The optical element control system according to the present invention can control the position of the optical element with respect to an object in accordance with the video scene. The observer can thereby see three-dimensionally the video and the object that are controlled in a suitable positional relationship depending on the video scene.

BRIEF DESCRIPTION OF THE DRAWINGS

FIG. 6 is a plan view of the optical element according to the first embodiment.

DESCRIPTION OF THE REPRESENTATIVE EMBODIMENTS

Figure 1:
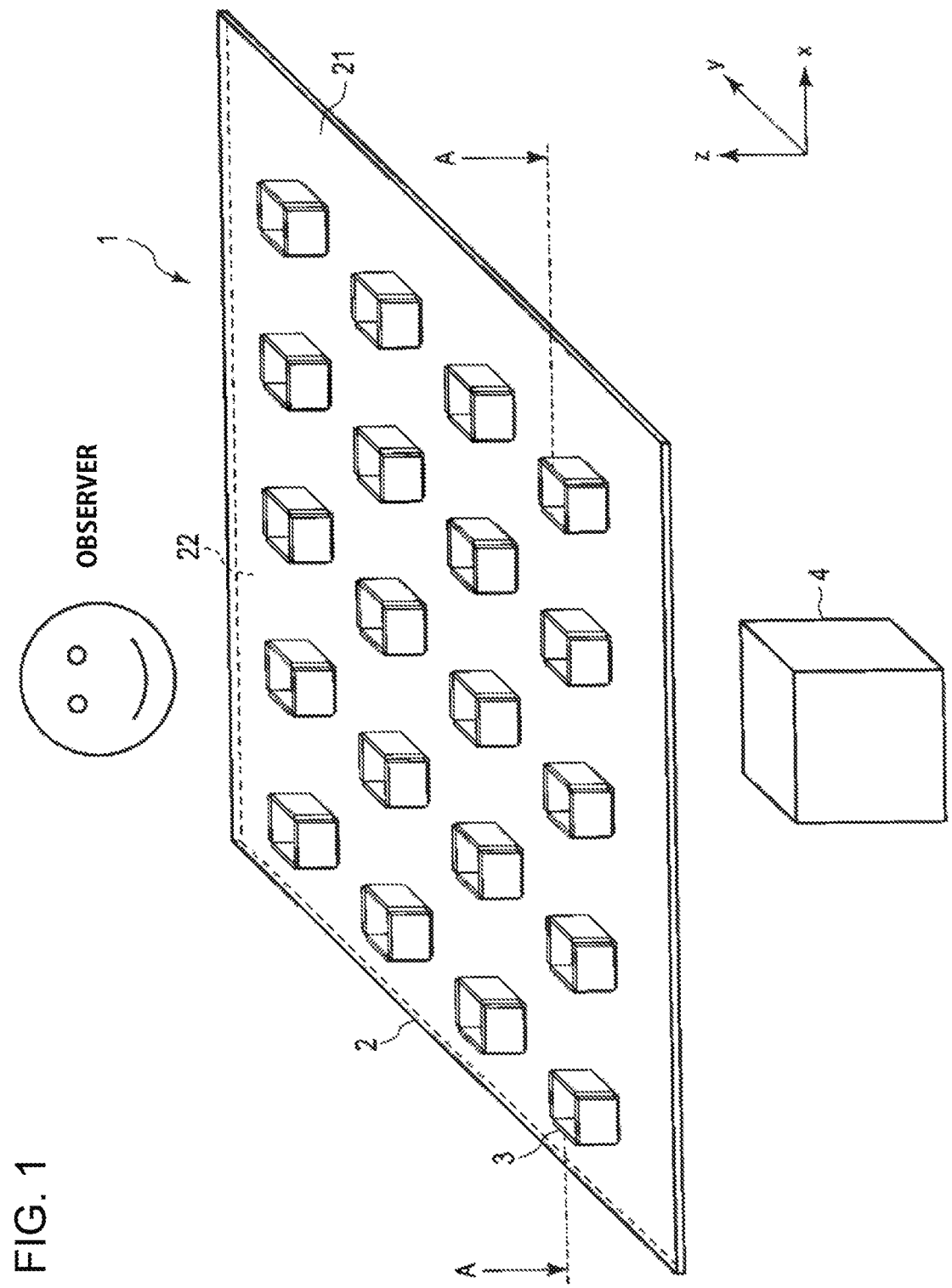
FIG. 1 is a perspective view of an optical element according to a first embodiment.

The embodiments of the present invention will be described in detail below with reference to the drawings. It is to be understood that the embodiments described below are intended to be representative and that the present invention is not intended to be limited to these embodiments. Structural elements that exhibit the same or similar functions are assigned with the same reference signs throughout all the drawings, and the duplicated description is omitted. Moreover, the drawings are schematic diagrams showing various embodiments and facilitating the understanding thereof. Although the shape, size, ratio, and the like of structures shown in the drawings may be different from those of actual structures, the design can be suitably changed.

First Embodiment

The first embodiment will be described. FIG. 1 is a perspective view of an optical element 1. The optical element 1 includes a substrate 2 and a plurality of information forming units 3.

The substrate 2 includes a first plane 21 and a second plane 22 on a side opposite to the first plane 21. The first plane 21 and the second plane 22 are rectangular. The substrate 2 may have a shape other than a rectangular shape.

The first plane 21 and the second plane 22 correspond to an xy plane including the x-axis and the y-axis. The height direction orthogonal to the plane of the substrate 2 corresponds to the z-axis. The substrate 2 is a transparent body composed of a material having transmissivity. For example, the substrate 2 is made of PET (polyethylene terephthalate), but is not limited thereto.

The material of the substrate 2 may be a material other than PET as long as it has transmissivity, and examples thereof include glass substrates, PEN (polyethylene naphthalate); thermoplastic resins, such as urethane resin, polycarbonate resin, polystyrene resin, and polyvinyl chloride resin; thermosetting resins, such as unsaturated polyester resin, melamine resin, epoxy resin, urethane (meth)acrylate, polyester (meth)acrylate, epoxy (meth)acrylate, polyol (meth)acrylate, melamine (meth)acrylate, and triazine (meth)acrylate; mixtures thereof; thermoforming materials having a radically polymerizable unsaturated group; and the like.

In FIG. 1, the information forming units 3 are provided on the first plane 21 of the substrate 2 in a lattice shape, including 5 units in the x-axial direction and 4 units in the Y-axial direction. Note that the number and arrangement of the information forming units 3 are not limited thereto. Although the detailed structure of the information forming units 3 is described later, an outline of the structure of the information forming units 3 is explained here.

The information forming units 3 do not have transmissivity in the z-axial direction. The information forming units 3 each have a surface facing a direction orthogonal to the z-axial direction. Each information forming unit 3 forms, on this surface, an element that becomes a part of information formed by the plurality of information forming units. As the height of the information forming units 3 is increased, the information forming units 3 can form more elements. The size and height of the information forming units 3 may be large or small, as long as the size allows observers to visually recognize the information.

A use example of the optical element 1 is explained with reference to FIG. 1.

An observer is assumed to view the optical element 1 from the first plane 21 side of the substrate 2 along the z-axis. There is an external object 4 on the second plane 22 side of the substrate 2. The optical element 1 has transmissivity in the z-axial direction in regions of the first plane 21 of the substrate 2 other than regions opposite to the information forming units 3. Therefore, the optical element 1 does not block the observer's view, and the observer can see the object 4 on the opposite side through the optical element 1. However, the observer cannot or can hardly see information formed by the plurality of information forming units 3.

The observer is assumed to view the optical element 1 from the first plane 21 side of the substrate 2 at a slight angle relative to the z-axis. The optical element 1 does not block the observer's view. The observer can see the object 4 through the optical element 1. Further, the observer can simultaneously see information formed by the optical element 1. When the optical element 1 is apart from the object 4, the observer can recognize information transmitted through the optical element 1 and information formed by the optical element 1 as separate pieces of information. The observer can see the information formed by the optical element 1 only by viewing the optical element 1 at a slight angle relative to the z-axis. Therefore, even when the observer sees the information formed by the optical element 1, it is not difficult for the observer to see the object 4 on the opposite side through the optical element 1.

As described above, the information formed by the optical element 1 can be regarded as a latent image. Accordingly, the first embodiment can also be applied to security technologies for preventing card forgery.

The structure of the information forming units 3 is explained.

Figure 2A:
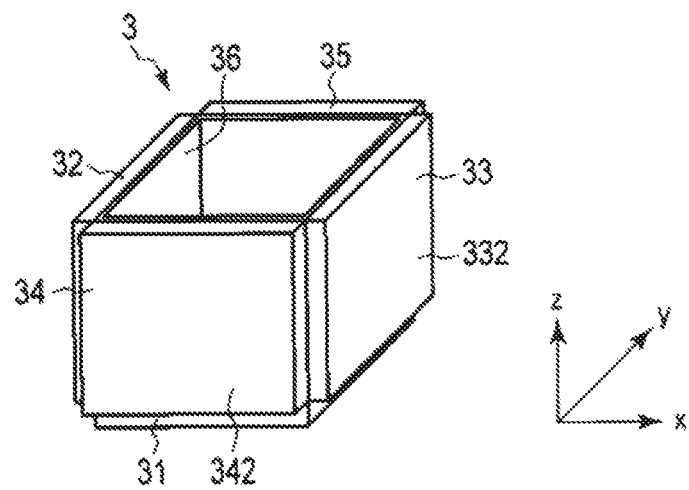
FIG. 2A is a view of an information forming unit of the optical element according to the first embodiment.
Figure 2B:
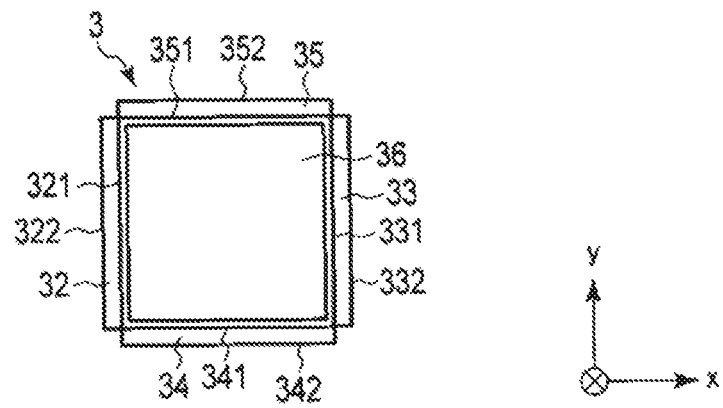
FIG. 2B is a view of the information forming unit of the optical element according to the first embodiment.
Figure 2C:
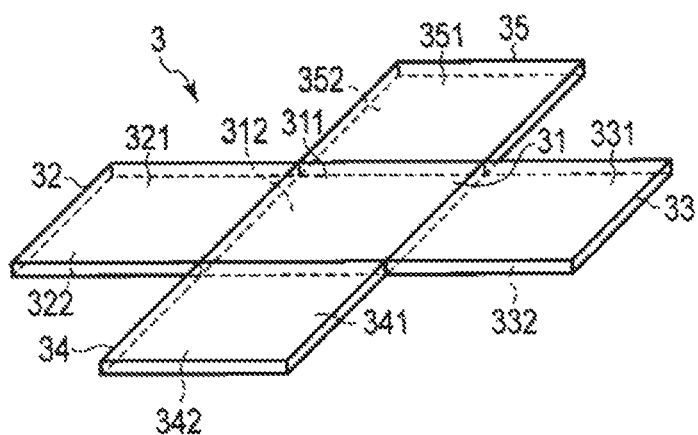
FIG. 2C is a view of the information forming unit of the optical element according to the first embodiment.

FIGS. 2A to 2C show the structure of each information forming unit 3. FIG. 2A is a perspective view of the information forming unit 3. FIG. 2B is a plan view of the information forming unit 3 viewed along the z-axis. FIG. 2C is a perspective view of the developed information forming unit 3. For the convenience of explanation, FIG. 2C shows the information forming unit 3 except for a metal film 36 described later.

The information forming unit 3 includes a bottom surface member 31, a first side surface member 32, a second side surface member 33, a third side surface member 34, a fourth side surface member 35, and a metal film 36. The bottom surface member 31 and the first to fourth side surface members 32 to 35 are transparent bodies composed of materials having transmissivity. For example, the bottom surface member 31 and the first to fourth side surface members 32 to 35 are composed of a UV (ultraviolet)-curable resin, but are not limited thereto.

The materials of the bottom surface member 31 and the first to fourth side surface members 32 to 35 may be materials other than UV-curable resins, and examples of such materials include thermoplastic resins, such as urethane resin, polycarbonate resin, polystyrene resin, and polyvinyl chloride resin; thermosetting resins, such as unsaturated polyester resin, melamine resin, epoxy resin, urethane (meth)acrylate, polyester (meth)acrylate, epoxy (meth)acrylate, polyol (meth)acrylate, melamine (meth)acrylate, and triazine (meth)acrylate; mixtures thereof; thermoforming materials having a radically polymerizable unsaturated group; and the like.

The bottom surface member 31 includes an inner surface 311 and an outer surface 312 on a side opposite to the inner surface 311. The inner surface 311 and the outer surface 312 are rectangular planes. The outer surface 312 is in contact with the first plane 21 of the substrate 2.

The first side surface member 32 includes an inner surface 321 and an outer surface 322 on a side opposite to the inner surface 321. The inner surface 321 and the outer surface 322 are rectangular planes. The inner surface 321 and the outer surface 322 are parallel to the z-axis. Therefore, the inner surface 321 and the outer surface 322 are orthogonal to the first plane 21 of the substrate 2. The inner surface 321 is in contact with a first side of the rectangular inner surface 311 of the bottom surface member 31.

The second side surface member 33 includes an inner surface 331 and an outer surface 332 on a side opposite to the inner surface 331. The inner surface 331 and the outer surface 332 are rectangular planes. The inner surface 331 and the outer surface 332 are parallel to the z-axis. Therefore, the inner surface 331 and the outer surface 332 are orthogonal to the first plane 21 of the substrate 2. The inner surface 331 is opposite to the inner surface 321 of the first side surface member 32. The inner surface 331 is in contact with a second side of the rectangular inner surface 311 of the bottom surface member 31.

The third side surface member 34 includes an inner surface 341 and an outer surface 342 on a side opposite to the inner surface 341. The inner surface 341 and the outer surface 342 are rectangular planes. The inner surface 341 and the outer surface 342 are parallel to the z-axis. Therefore, the inner surface 341 and the outer surface 342 are orthogonal to the first plane 21 of the substrate 2. The inner surface 341 is in contact with a third side of the rectangular inner surface 311 of the bottom surface member 31.

The fourth side surface member 35 includes an inner surface 351 and an outer surface 352 on a side opposite to the inner surface 351. The inner surface 351 and the outer surface 352 are rectangular planes. The inner surface 351 and the outer surface 352 are parallel to the z-axis. Therefore, the inner surface 351 and the outer surface 352 are orthogonal to the first plane 21 of the substrate 2. The inner surface 351 is opposite to the inner surface 341 of the third side surface member 34. The inner surface 351 is in contact with a fourth side of the rectangular inner surface 311 of the bottom surface member 31.

As described above, the inner surfaces of the first to fourth side surface members 32 to 35 face different directions.

The metal film 36 covers the inner surface 311, the inner surface 321, the inner surface 331, the inner surface 341, and the inner surface 351. For example, the metal film 36 is composed of nickel, but is not limited thereto. Because the metal film 36 covers the inner surface 311 of the bottom surface member 31, the information forming unit 3 does not have transmissivity in the z-axial direction.

Next, an example of the method of incorporating information into a plurality of information forming units 3 is explained using FIGS. 3, 4A to 4D, and 5A to 5D.

Figure 3:
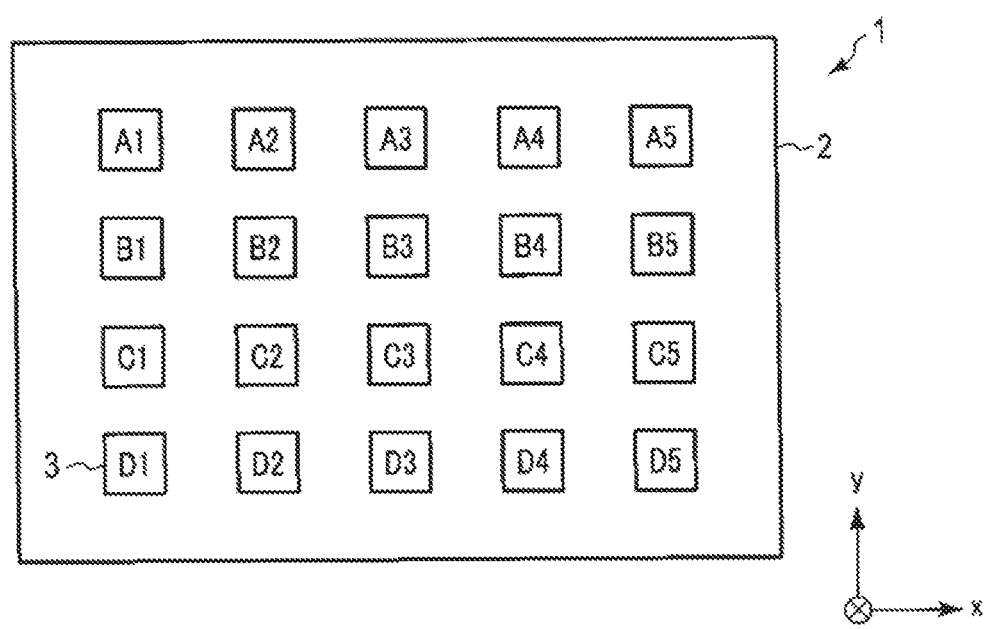
FIG. 3 is a plan view of the optical element according to the first embodiment.

FIG. 3 is a plan view of the optical element 1 viewed along the z-axis. Here, reference signs A1, A2, A3, A4, A5, B1, B2, B3, B4, B5, C1, C2, C3, C4, C5, D1, D2, D3, D4, and D5 are assigned to a plurality of information forming units 3.

FIG. 4 is a plan view of the optical element 1 viewed along the z-axis.

Figure 4A:
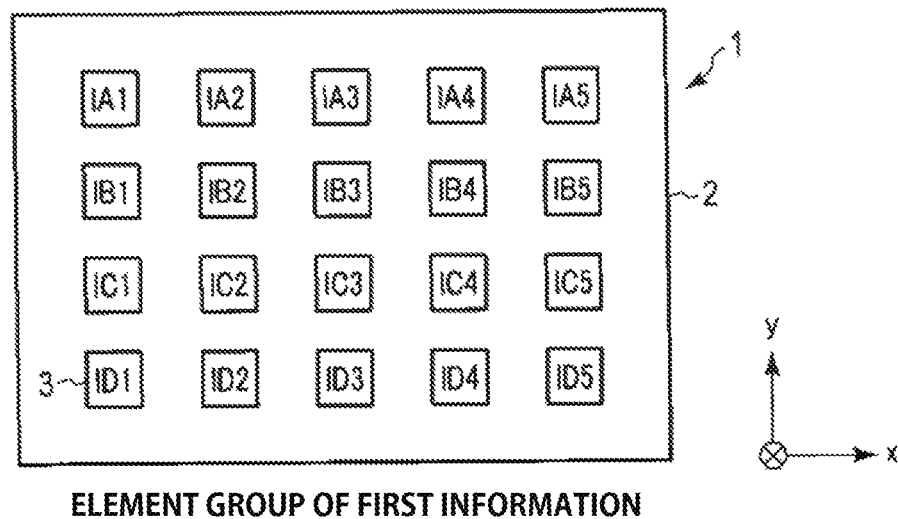
FIG. 4A is a plan view of the optical element according to the first embodiment.

FIG. 4A shows an element group of first information formed by a plurality of information forming units 3.

The first information is a set of elements each formed by the inner surface 321 of the first side surface member 32 provided in each of the plurality of information forming units 3. The information forming units 3 each form an element that becomes a part of the first information by the inner surface 321 of the first side surface member 32. For example, the first information is images formed by the plurality of information forming units 3. The information forming units 3 each form an image that becomes a part of the images serving as the first information by the inner surface 321 of the first side surface member 32.

An information forming unit A1 forms an element 1A1 by the inner surface 321 of the first side surface member 32. Similarly, information forming units A2, A3, A4, and A5 form elements 1A2, 1A3, 1A4, and 1A5, respectively, by the inner surface 321 of the first side surface member 32. An information forming unit B1 forms an element 1B1 by the inner surface 321 of the first side surface member 32. Similarly, information forming units B2, B3, B4, and B5 form elements 1B2, 1B3, 1B4, and 1B5, respectively, by the inner surface 321 of the first side surface member 32. An information forming unit C1 forms an element 1C1 by the inner surface 321 of the first side surface member 32. Similarly, information forming units C2, C3, C4, and C5 form elements 1C2, 1C3, 1C4, and 105, respectively, by the inner surface 321 of the first side surface member 32. An information forming unit D1 forms an element 1D1 by the inner surface 321 of the first side surface member 32. Similarly, information forming units D2, D3, D4, and D5 form elements 1D2, 1D3, 1D4, and 1D5, respectively, by the inner surface 321 of the first side surface member 32.

The first information becomes coherent information using a set of the elements 1A1 to 1A5, 1B1 to 1B5, 1C1 to 105, and 1D1 to 1D5 each formed by the inner surface 321 of the first side surface member 32 provided in each of the plurality of information forming units 3.

Figure 4B:
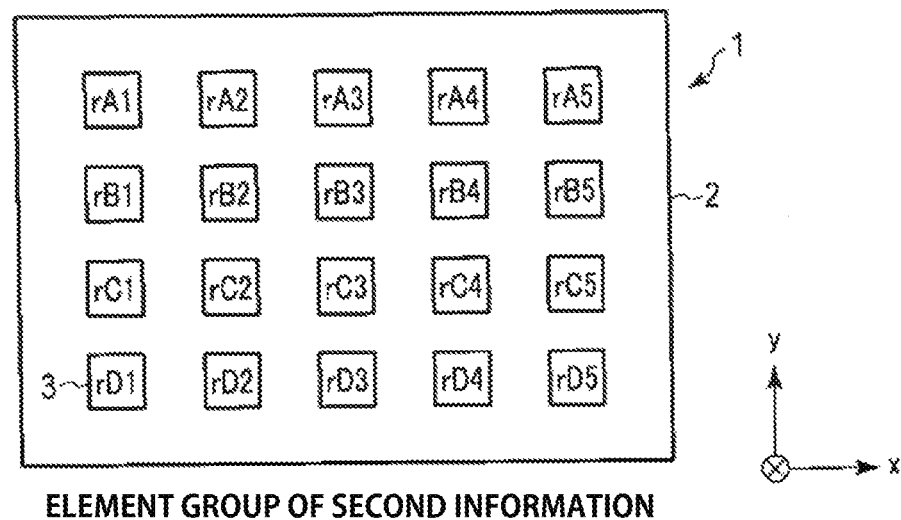
FIG. 4B is a plan view of the optical element according to the first embodiment.

FIG. 4B shows an element group of second information formed by the plurality of information forming units 3.

The second information is a set of elements each formed by the inner surface 331 of the second side surface member 33 provided in each of the plurality of information forming units 3. The information forming units 3 each form an element that becomes a part of the second information by the inner surface 331 of the second side surface member 33.

The information forming unit A1 forms an element rA1 by the inner surface 331 of the second side surface member 33. Similarly, the information forming units A2, A3, A4, and A5 form elements rA2, rA3, rA4, and rA5, respectively, by the inner surface 331 of the second side surface member 33. The information forming unit B1 forms an element rB1 by the inner surface 331 of the second side surface member 33. Similarly, the information forming units B2, B3, B4, and B5 form elements rB2, rB3, rB4, and rB5, respectively, by the inner surface 331 of the second side surface member 33. The information forming unit C1 forms an element rC1 by the inner surface 331 of the second side surface member 33. Similarly, the information forming units C2, C3, C4, and C5 form elements rC2, rC3, rC4, and rC5, respectively, by the inner surface 331 of the second side surface member 33. The information forming unit D1 forms an element rD1 by the inner surface 331 of the second side surface member 33. Similarly, the information forming units D2, D3, D4, and D5 form elements rD2, rD3, rD4, and rD5, respectively, by the inner surface 331 of the second side surface member 33.

The second information becomes coherent information using a set of the elements rA1 to rA5, rB1 to rB5, rC1 to rC5, and rD1 to rD5 each formed by the inner surface 331 of the second side surface member 33 provided in each of the plurality of information forming units 3.

Figure 4C:
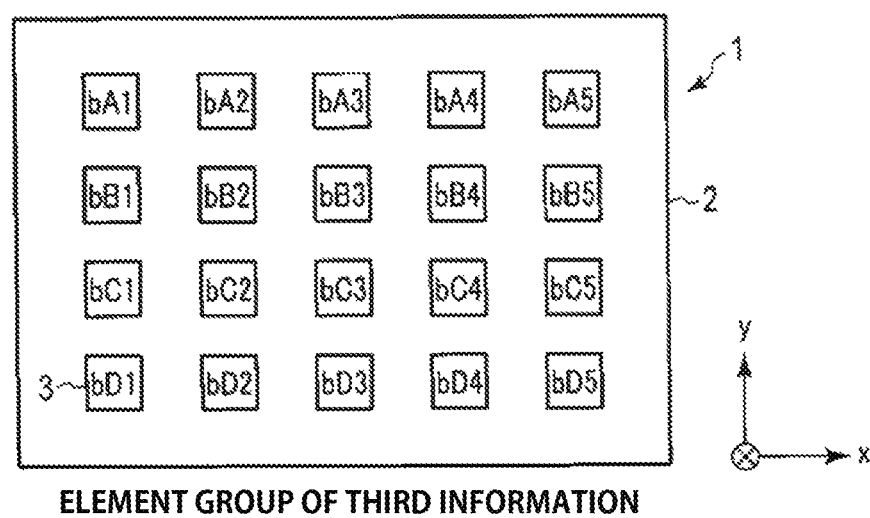
FIG. 4C is a plan view of the optical element according to the first embodiment.

FIG. 4C shows an element group of third information formed by the plurality of information forming units 3.

The third information is a set of elements each formed by the inner surface 341 of the third side surface member 34 provided in each of the plurality of information forming units 3. The information forming units 3 each form an element that becomes a part of the third information by the inner surface 341 of the third side surface member 34.

The information forming unit A1 forms an element bA1 by the inner surface 341 of the third side surface member 34. Similarly, the information forming units A2, A3, A4, and A5 form elements bA2, bA3, bA4, and bA5, respectively, by the inner surface 341 of the third side surface member 34. The information forming unit B1 forms an element bB1 by the inner surface 341 of the third side surface member 34. Similarly, the information forming units B2, B3, B4, and B5 form elements bB2, bB3, bB4, and bB5, respectively, by the inner surface 341 of the third side surface member 34. The information forming unit C1 forms an element bC1 by the inner surface 341 of the third side surface member 34. Similarly, the information forming units C2, C3, C4, and C5 form elements bC2, bC3, bC4, and bC5, respectively, by the inner surface 341 of the third side surface member 34. The information forming unit D1 forms an element bD1 by the inner surface 341 of the third side surface member 34. Similarly, the information forming units D2, D3, D4, and D5 form elements bD2, bD3, bD4, and bD5, respectively, by the inner surface 341 of the third side surface member 34.

The third information becomes coherent information using a set of the elements bA1 to bA5, bB1 to bB5, bC1 to bC5, and bD1 to bD5 each formed by the inner surface 341 of the third side surface member 34 provided in each of the plurality of information forming units 3.

Figure 4D:
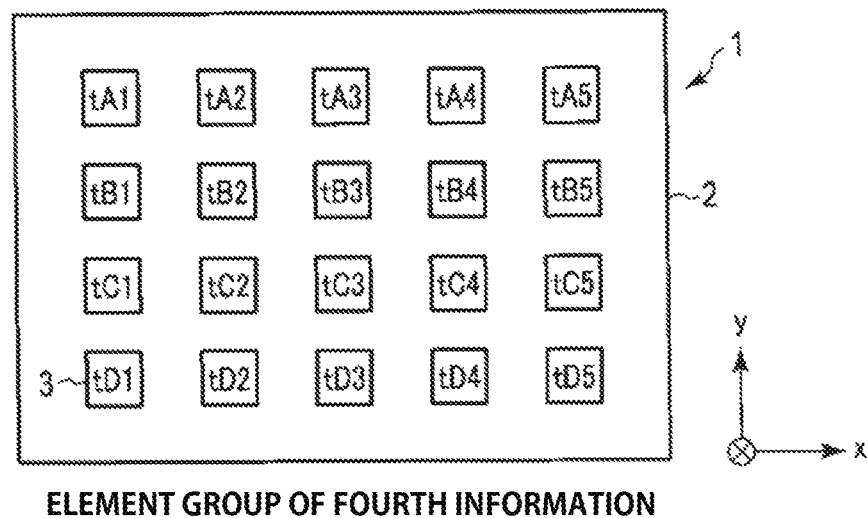
FIG. 4D is a plan view of the optical element according to the first embodiment.

FIG. 4D shows an element group of fourth information formed by the plurality of information forming units 3.

The fourth information is a set of elements each formed by the inner surface 351 of the fourth side surface member 35 provided in each of the plurality of information forming units 3. The information forming units 3 each form an element that becomes a part of the fourth information by the inner surface 351 of the fourth side surface member 35.

The information forming unit A1 forms an element tA1 by the inner surface 351 of the fourth side surface member 35. Similarly, the information forming units A2, A3, A4, and A5 form elements tA2, tA3, tA4, and tA5, respectively, by the inner surface 351 of the fourth side surface member 35. The information forming unit B1 forms an element tB1 by the inner surface 351 of the fourth side surface member 35. Similarly, the information forming units B2, B3, B4, and B5 form elements tB2, tB3, tB4, and tB5, respectively, by the inner surface 351 of the fourth side surface member 35. The information forming unit C1 forms an element tC1 by the inner surface 351 of the fourth side surface member 35. Similarly, the information forming units C2, C3, C4, and C5 form elements tC2, tC3, tC4, and tC5, respectively, by the inner surface 351 of the fourth side surface member 35. The information forming unit D1 forms an element tD1 by the inner surface 351 of the fourth side surface member 35. Similarly, the information forming units D2, D3, D4, and D5 form elements tD2, tD3, tD4, and tD5, respectively, by the inner surface 351 of the fourth side surface member 35.

The fourth information becomes coherent information using a set of the elements tA1 to tA5, tB1 to tB5, tC1 to tC5, and tD1 to tD5 each formed by the inner surface 351 of the fourth side surface member 35 provided in each of the plurality of information forming units 3.

The first information to the fourth information may be independent or related to each other.

FIG. 5 shows plan views of the developed information forming units 3.

Figure 5A:
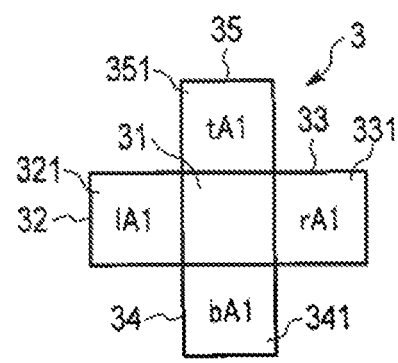
FIG. 5A is a plan view of the developed information forming unit of the optical element according to the first embodiment.

FIG. 5A shows elements formed by the inner surfaces of the information forming unit A1. An image serving as the element 1A1 is printed on the inner surface 321 of the first side surface member 32. An image serving as the element rA1 is printed on the inner surface 331 of the second side surface member 33. An image serving as the element bA1 is printed on the inner surface 341 of the third side surface member 34. An image serving as the element tA1 is printed on the inner surface 351 of the fourth side surface member 35. Images are also printed in the information forming units A2, A3, A4, and A5, as in the information forming unit A1 described above.

Figure 5B:
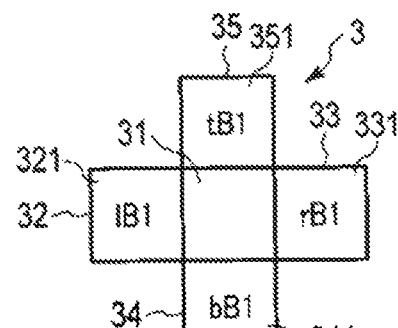
FIG. 5B is a plan view of the developed information forming unit of the optical element according to the first embodiment.

FIG. 5B shows elements formed by the inner surfaces of the information forming unit B1. An image serving as the element 1B1 is printed on the inner surface 321 of the first side surface member 32. An image serving as the element rB1 is printed on the inner surface 331 of the second side surface member 33. An image serving as the element bB1 is printed on the inner surface 341 of the third side surface member 34. An image serving as the element tB1 is printed on the inner surface 351 of the fourth side surface member 35. Images are also printed in the information forming units B2, B3, B4, and B5, as in the information forming unit B1 described above.

Figure 5C:
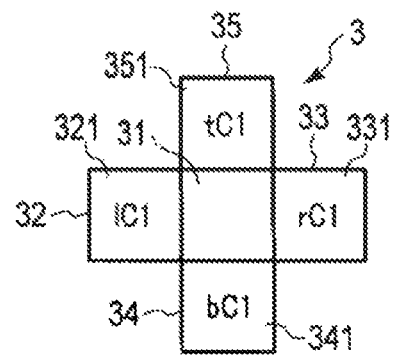
FIG. 5C is a plan view of the developed information forming unit of the optical element according to the first embodiment.

FIG. 5C shows elements formed by the inner surfaces of the information forming unit C1. An image serving as the element 1C1 is printed on the inner surface 321 of the first side surface member 32. An image serving as the element rC1 is printed on the inner surface 331 of the second side surface member 33. An image serving as the element bC1 is printed on the inner surface 341 of the third side surface member 34. An image serving as the element tC1 is printed on the inner surface 351 of the fourth side surface member 35. Images are also printed in the information forming units C2, C3, C4, and C5, as in the information forming unit C1 described above.

Figure 5D:
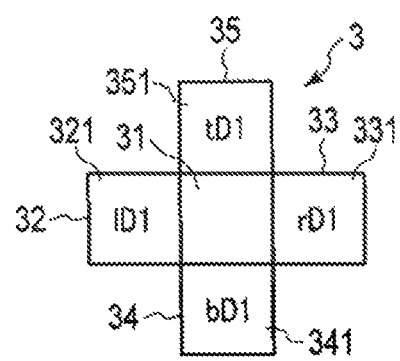
FIG. 5D is a plan view of the developed information forming unit of the optical element according to the first embodiment.

FIG. 5D shows elements formed by the inner surfaces of the information forming unit D1. An image serving as the element 1D1 is printed on the inner surface 321 of the first side surface member 32. An image serving as the element rD1 is printed on the inner surface 331 of the second side surface member 33. An image serving as the element bD1 is printed on the inner surface 341 of the third side surface member 34. An image serving as the element tD1 is printed on the inner surface 351 of the fourth side surface member 35. Images are also printed in the information forming units D2, D3, D4, and D5, as in the information forming unit D1 described above.

Next, the observer's visual recognition of information formed by the optical element 1 is explained.

FIG. 6 is a plan view of the optical element 1 viewed along the z-axis.

The visual recognition of the first information by the observer will now be explained. The observer views the optical element 1 from the first plane 21 side of the substrate 2 along a direction inclined with respect to the z-axis and across the outer surface 322 and the inner surface 321 of the first side surface member 32 in this order. As shown in (a) of FIG. 6, the observer can see the image printed on the inner surface 321 through the outer surface 322 of the first side surface member 32. The observer can see coherent images as the first information by seeing the images each printed on the inner surface 321 of the first side surface member 32 of each of the plurality of information forming units 3.

The visual recognition of the second information group by the observer is explained. The observer views the optical element 1 from the first plane 21 side of the substrate 2 along a direction inclined with respect to the z-axis and across the outer surface 332 and the inner surface 331 of the second side surface member 33 in this order. As shown in (b) of FIG. 6, the observer can see the image printed on the inner surface 331 through the outer surface 332 of the second side surface member 33. The observer can see coherent images as the second information by seeing the images each printed on the inner surface 331 of the second side surface member 33 of each of the plurality of information forming units 3.

The visual recognition of the third information group by the observer is explained. The observer views the optical element 1 from the first plane 21 side of the substrate 2 along a direction inclined with respect to the z-axis and across the outer surface 342 and the inner surface 341 of the third side surface member 34 in this order. As shown in (c) of FIG. 6, the observer can see the image printed on the inner surface 341 through the outer surface 342 of the third side surface member 34. The observer can see coherent images as the third information by seeing the images each printed on the inner surface 341 of the third side surface member 34 of each of the plurality of information forming units 3.

The visual recognition of the fourth information group by the observer is explained. The observer views the optical element 1 from the first plane 21 side of the substrate 2 along a direction inclined with respect to the z-axis and across the outer surface 352 and the inner surface 351 of the fourth side surface member 35 in this order. As shown in (d) of FIG. 6, the observer can see the image printed on the inner surface 351 through the outer surface 352 of the fourth side surface member 35. The observer can see coherent images as the fourth information by seeing the images each printed on the inner surface 351 of the fourth side surface member 35 of each of the plurality of information forming units 3.

As described above, the optical element 1 can provide a plurality of pieces of information. Accordingly, the observer can see different information in the optical element 1 by changing the angle or direction in which the observer sees the optical element 1.

According to the first embodiment, the optical element 1 can simultaneously provide external information visible through the optical element 1, and information formed by the optical element 1. The observer can thereby see the external information through the optical element 1 by viewing the optical element 1 along the z-axis. Further, the observer can simultaneously see an external object 4 visible through the optical element 1, and information provided by the optical element 1, by viewing the optical element 1 along a direction across the z-axis. Furthermore, the observer can recognize the external object 4 visible through the optical element 1, and the information provided by the optical element 1, as separate pieces of information. In addition, a plurality of observers can simultaneously use one optical element 1 to see the same information or different information.

Next, several modified examples of the first embodiment are explained.

Figure 7A:
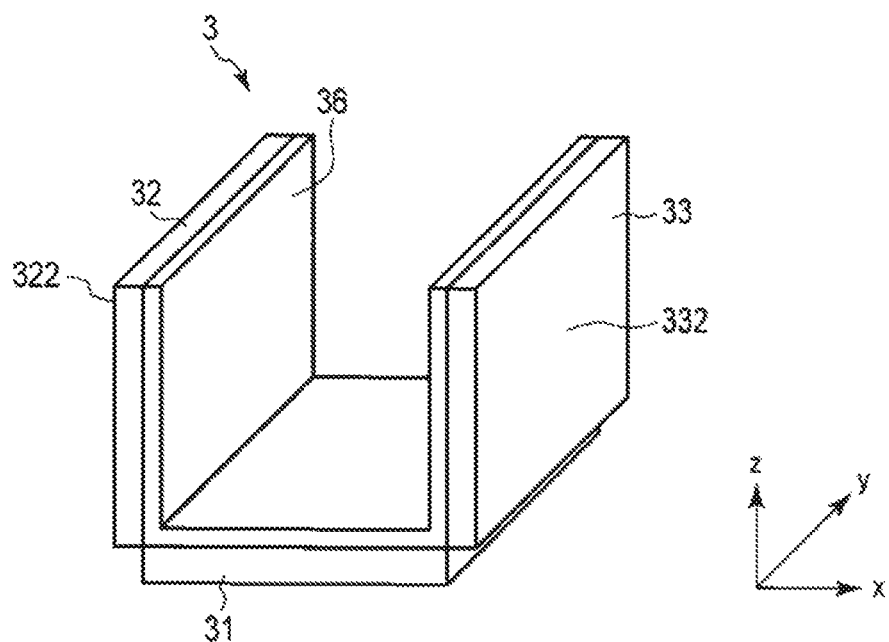
FIG. 7A is a view of an information forming unit of an optical element according to a modified example of the first embodiment.
Figure 7B:
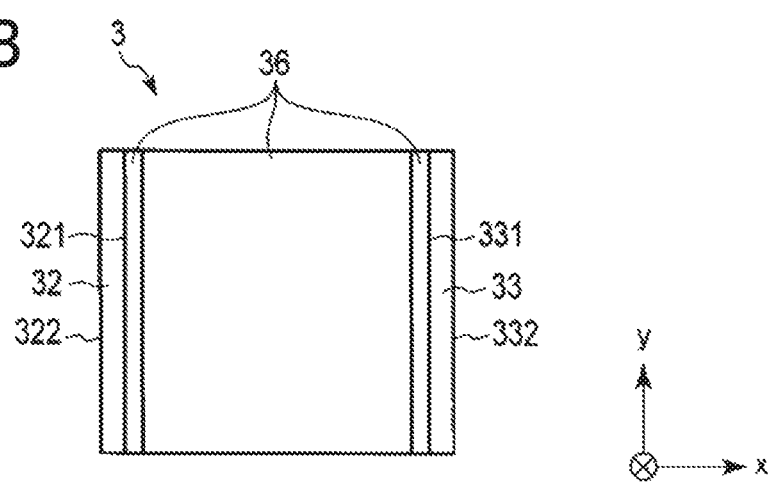
FIG. 7B is a view of the information forming unit of the optical element according to the modified example of the first embodiment.

As a modified example, each information forming unit 3 may have at least one surface parallel to the z-axis, depending on the number of pieces of information provided by the optical element 1. FIGS. 7A and 7B show an information forming unit 3 having two surfaces that are parallel to the z-axis and face different directions. FIG. 7A is a perspective view of the information forming unit 3. FIG. 7B is a plan view of the information forming unit 3 viewed along the z-axis. The information forming unit 3 includes a bottom surface member 31, a first side surface member 32, a second side surface member 33, and a metal film 36, but does not include a third side surface member 34 and a fourth side surface member 35 described above.

Figure 8A:
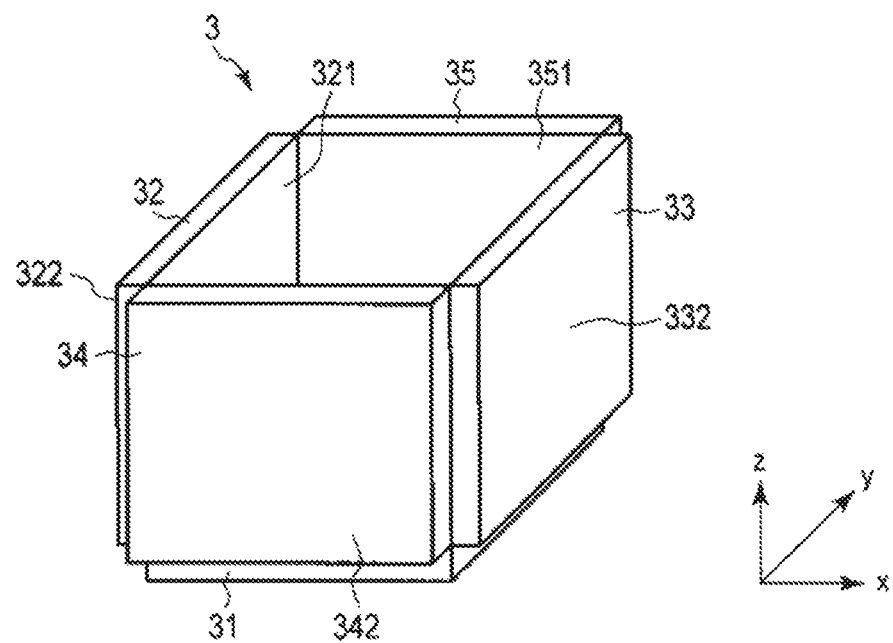
FIG. 8A is a view of an information forming unit of an optical element according to another modified example of the first embodiment.
Figure 8B:
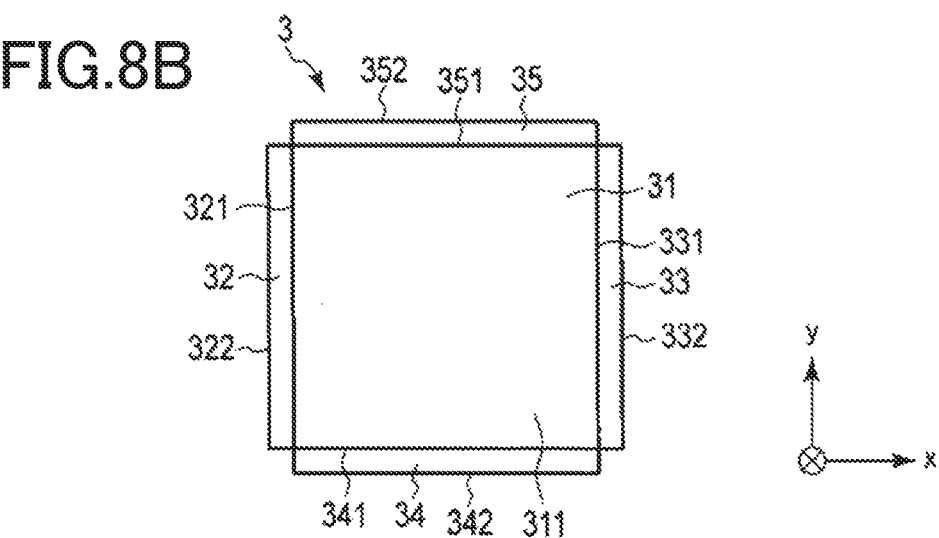
FIG. 8B is a view of the information forming unit of the optical element according to another modified example of the first embodiment.

As another modified example, the information forming unit 3 may not include a metal film 36 described above. FIGS. 8A and 8B show an information forming unit 3. FIG. 8A is a perspective view of the information forming unit 3. FIG. 8B is a plan view of the information forming unit 3 viewed along the z-axis. The information forming unit 3 includes a bottom surface member 31 and first to fourth side surface members 32 to 35, but does not include a metal film 36 described above. Because the information forming unit 3 does not include a metal film 36, and the bottom surface member 31 and the first to fourth side surface members 32 to 35 have transmissivity, the information forming unit 3 has transmissivity as a whole in the z-axial direction. The optical element 1 including such information forming units 3 has transmissivity in the z-axial direction in the entire region of the first plane 21 of the substrate 2. Accordingly, the observer can easily see an external object 4 through the optical element 1.

Further, in the modified example shown in FIGS. 8A and 8B, the first to fourth side surface members 32 to 35 may be composed of non-transparent bodies. The observer can see an image printed on the inner surface 321 by viewing the optical element 1 from the first plane 21 side of the substrate 2 along a direction inclined with respect to the z-axis and across the inner surface 321 and the outer surface 322 of the first side surface member 32 in this order. Similarly, the observer can see an image printed on the inner surface 331 by viewing the optical element 1 from the first plane 21 side of the substrate 2 along a direction inclined with respect to the z-axis and across the inner surface 331 and the outer surface 332 of the second side surface member 33 in this order. The observer can see an image printed on the inner surface 341 by viewing the optical element 1 from the first plane 21 side of the substrate 2 along a direction inclined with respect to the z-axis and across the inner surface 341 and the outer surface 342 of the third side surface member 34 in this order. The observer can see an image printed on the inner surface 351 by viewing the optical element 1 from the first plane 21 side of the substrate 2 along a direction inclined with respect to the z-axis and across the inner surface 351 and the outer surface 352 of the fourth side surface member 35 in this order.

Furthermore, in the modified example shown in FIGS. 8A and 8B, an image may be printed on the outer surface 322 of the first side surface member 32, in place of the inner surface 321 of the first side surface member 32. Similarly, an image may be printed on the outer surface 332 of the second side surface member 33, in place of the inner surface 331 of the second side surface member 33. An image may be printed on the outer surface 342 of the third side surface member 34, in place of the inner surface 341 of the third side surface member 34. An image may be printed on the outer surface 352 of the fourth side surface member 35, in place of the inner surface 351 of the fourth side surface member 35.

When an image is printed on each outer surface, for example, the first side surface member 32, the second side surface member 33, the third side surface member 34, and the fourth side surface member 35 may be composed of non-transparent bodies. The observer can see the image printed on the outer surface 322 by viewing the optical element 1 from the first plane 21 side of the substrate 2 along a direction inclined with respect to the z-axis and across the outer surface 322 and the inner surface 321 of the first side surface member 32 in this order. Similarly, the observer can see the image printed on the outer surface 332 by viewing the optical element 1 from the first plane 21 side of the substrate 2 along a direction inclined with respect to the z-axis and across the outer surface 332 and the inner surface 331 of the second side surface member 33 in this order. The observer can see the image printed on the outer surface 342 by viewing the optical element 1 from the first plane 21 side of the substrate 2 along a direction inclined with respect to the z-axis and across the outer surface 342 and the inner surface 341 of the third side surface member 34 in this order. The observer can see the image printed on the outer surface 352 by viewing the optical element 1 from the first plane 21 side of the substrate 2 along a direction inclined with respect to the z-axis and across the outer surface 352 and the inner surface 351 of the fourth side surface member 35 in this order.

When an image is printed on each outer surface, as another example, a metal film may cover the outer surface 322 of the first side surface member 32, the outer surface 332 of the second side surface member 33, the outer surface 342 of the third side surface member 34, and the outer surface 352 of the fourth side surface member 35. The observer can see the image printed on the outer surface 322 by viewing the optical element 1 from the first plane 21 side of the substrate 2 along a direction inclined with respect to the z-axis and across the inner surface 321 and the outer surface 322 of the first side surface member 32 in this order. Similarly, the observer can see the image printed on the outer surface 332 by viewing the optical element 1 from the first plane 21 side of the substrate 2 along a direction inclined with respect to the inner surface 331 and the outer surface 332 of the second side surface member 33 in this order. The observer can see the image printed on the outer surface 342 by viewing the optical element 1 from the first plane 21 side of the substrate 2 along a direction inclined with respect to the z-axis and across the inner surface 341 and the outer surface 342 of the third side surface member 34 in this order. The observer can see the image printed on the outer surface 352 by viewing the optical element 1 from the first plane 21 side of the substrate 2 along a direction inclined with respect to the z-axis and across the inner surface 351 and the outer surface 352 of the fourth side surface member 35 in this order.

FIGS. 9A to 9E show still other modified examples of the optical element 1.

Figure 9A:
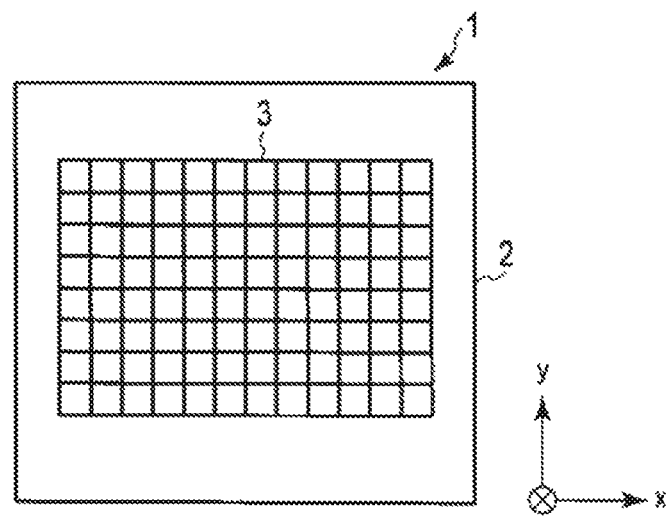
FIG. 9A is a plan view of an optical element according to still another modified example of the first embodiment.

As shown in FIG. 9A, a plurality of information forming units 3 may be in contact with each other.

Figure 9B:
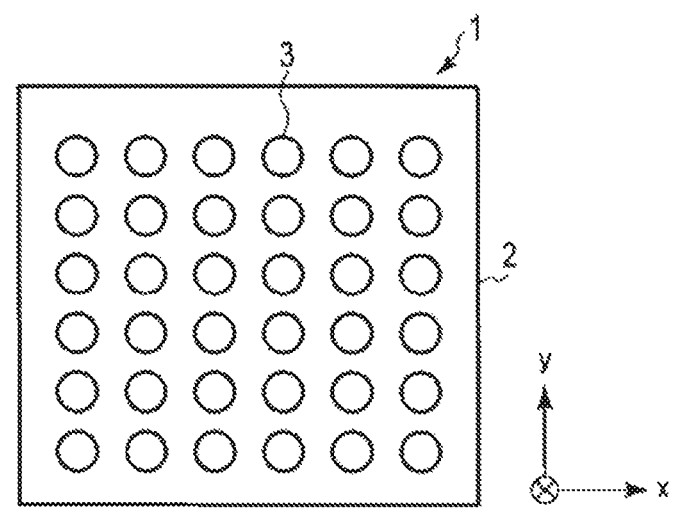
FIG. 9B is a plan view of an optical element according to still another modified example of the first embodiment.

As shown in FIG. 9B, a plurality of information forming units 3 each may have a cylindrical surface that is parallel to the z-axis and forms an element of information.

Figure 9C:
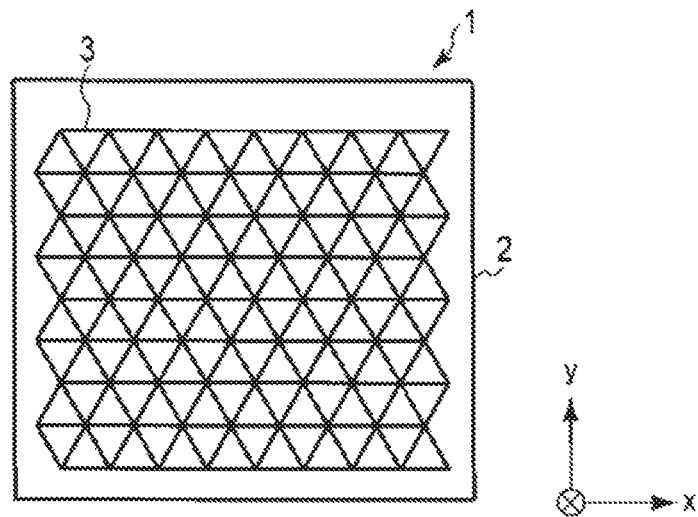
FIG. 9C is a plan view of an optical element according to still another modified example of the first embodiment.

As shown in FIG. 9C, a plurality of information forming units 3 each may have three surfaces that are parallel to the z-axis and face different directions. Further, the plurality of information forming units 3 may be in contact with each other.

Figure 9D:
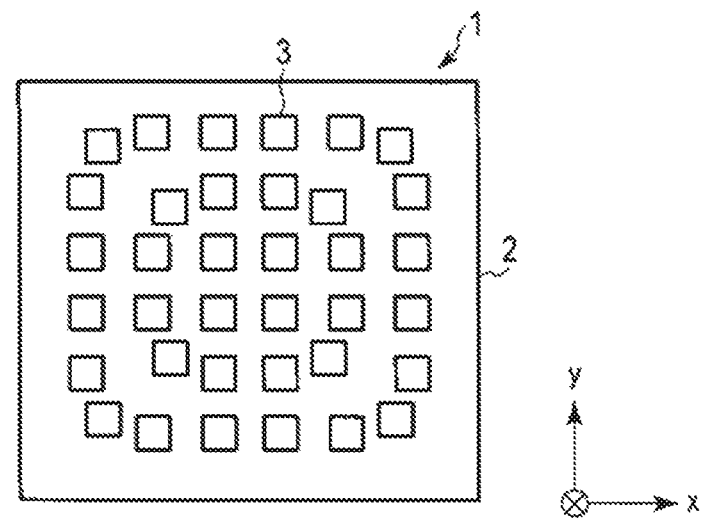
FIG. 9D is a plan view of an optical element according to still another modified example of the first embodiment.

As shown in FIG. 9D, the space between adjacent information forming units 3 may not be uniform.

Figure 9E:
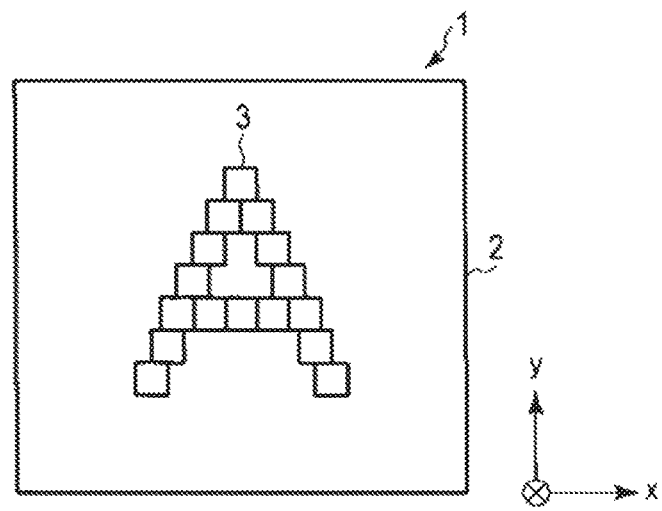
FIG. 9E is a plan view of an optical element according to still another modified example of the first embodiment.

As shown in FIG. 9E, a plurality of information forming units 3 may be arranged on the substrate 2 so as to form a picture pattern. For example, the plurality of information forming units 3 form the alphabet character A.

As still another modified example, the optical element 1 may omit a substrate 2 by including a plurality of information forming units 3 connected to each other. In the optical element 1, the plurality of information forming units 3 may be sealed with a material having transmissivity.

Second Embodiment

Next, the second embodiment is explained. The second embodiment is different from the first embodiment in the following respect. The information forming units 3 each include diffraction gratings, in place of the printed images, in the first to fourth side surface members 32 to 35.

Figure 10:
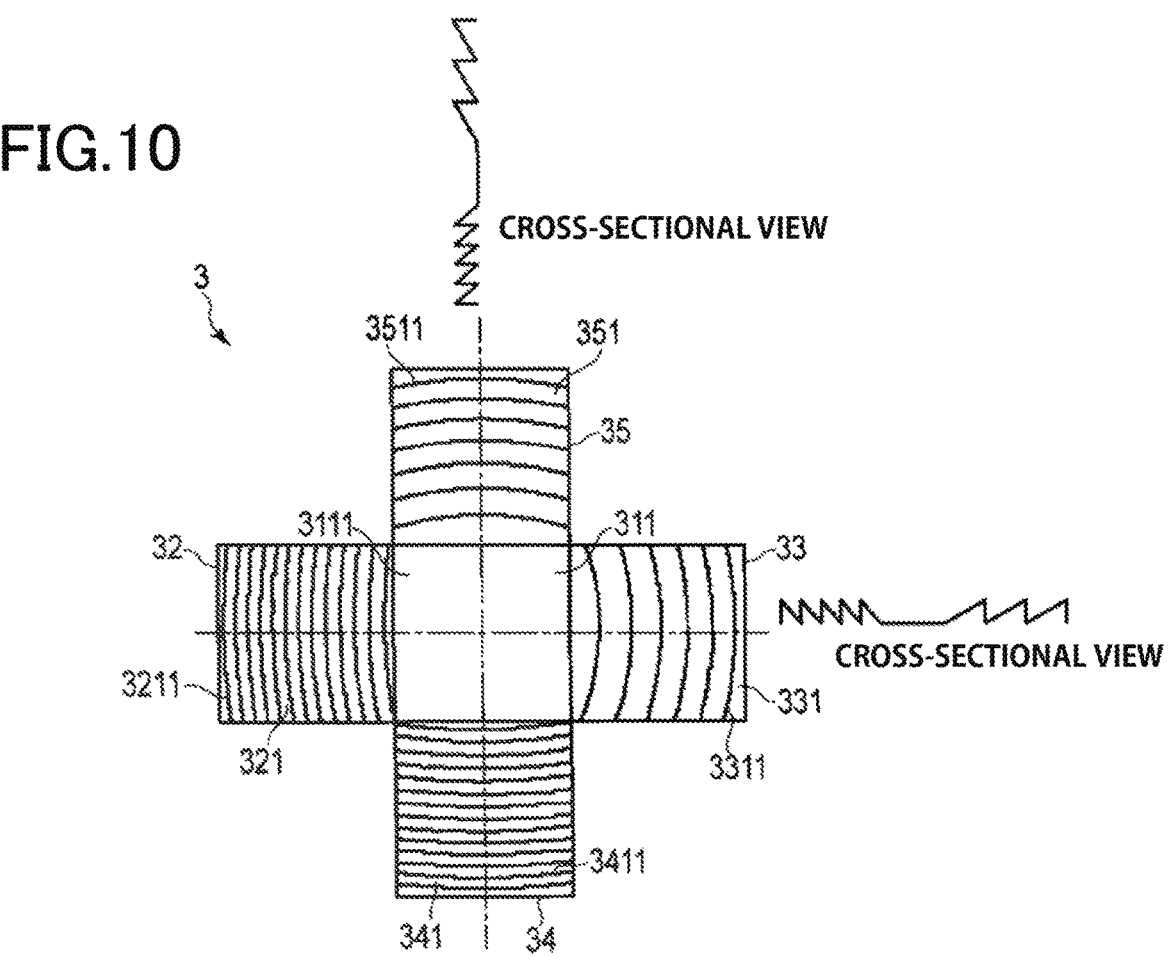
FIG. 10 is a plan view of a developed information forming unit of an optical element according to a second embodiment.

FIG. 10 is a plan view of the developed information forming unit 3.

The inner surface 321 of the first side surface member 32 is provided with a diffraction grating 3211 for forming an element of first information. The inner surface 331 of the second side surface member 33 is provided with a diffraction grating 3311 for forming an element of second information. The inner surface 341 of the third side surface member 34 is provided with a diffraction grating 3411 for forming an element of third information. The inner surface 351 of the fourth side surface member 35 is provided with a diffraction grating 3511 for forming an element of fourth information.

The first information can be represented as a visual effect formed by the diffraction grating 3211 provided on the inner surface 321. The second information can be represented as a visual effect formed by the diffraction grating 3311 provided on the inner surface 331. The third information can be represented as a visual effect formed by the diffraction grating 3411. The fourth information can be represented as a visual effect formed by the diffraction grating 3511. In the example shown in FIG. 10, the diffraction grating 3211, the diffraction grating 3311, the diffraction grating 3411, and the diffraction grating 3511 have different pitches. Accordingly, the first information, the second information, the third information, and the fourth information provide different visual effects. The diffraction grating 3211, the diffraction grating 3311, the diffraction grating 3411, and the diffraction grating 3511 may have the same pitch.

According to the second embodiment, the observer can simultaneously obtain information about an external object 4 transmitted through the optical element 1, and information as visual effects provided by the optical element 1, by viewing the optical element 1 along a direction across the z-axis. Further, the observer can obtain different visual effects from the optical element 1 by changing the angle or direction in which the observer views the optical element 1.

Third Embodiment

Next, the third embodiment is explained. The third embodiment is different from the first embodiment in the following respect. The information forming units 3 each include a structure that diffuses light (hereinafter referred to as "light diffusion structure"), in place of the printed images.

Figure 11:
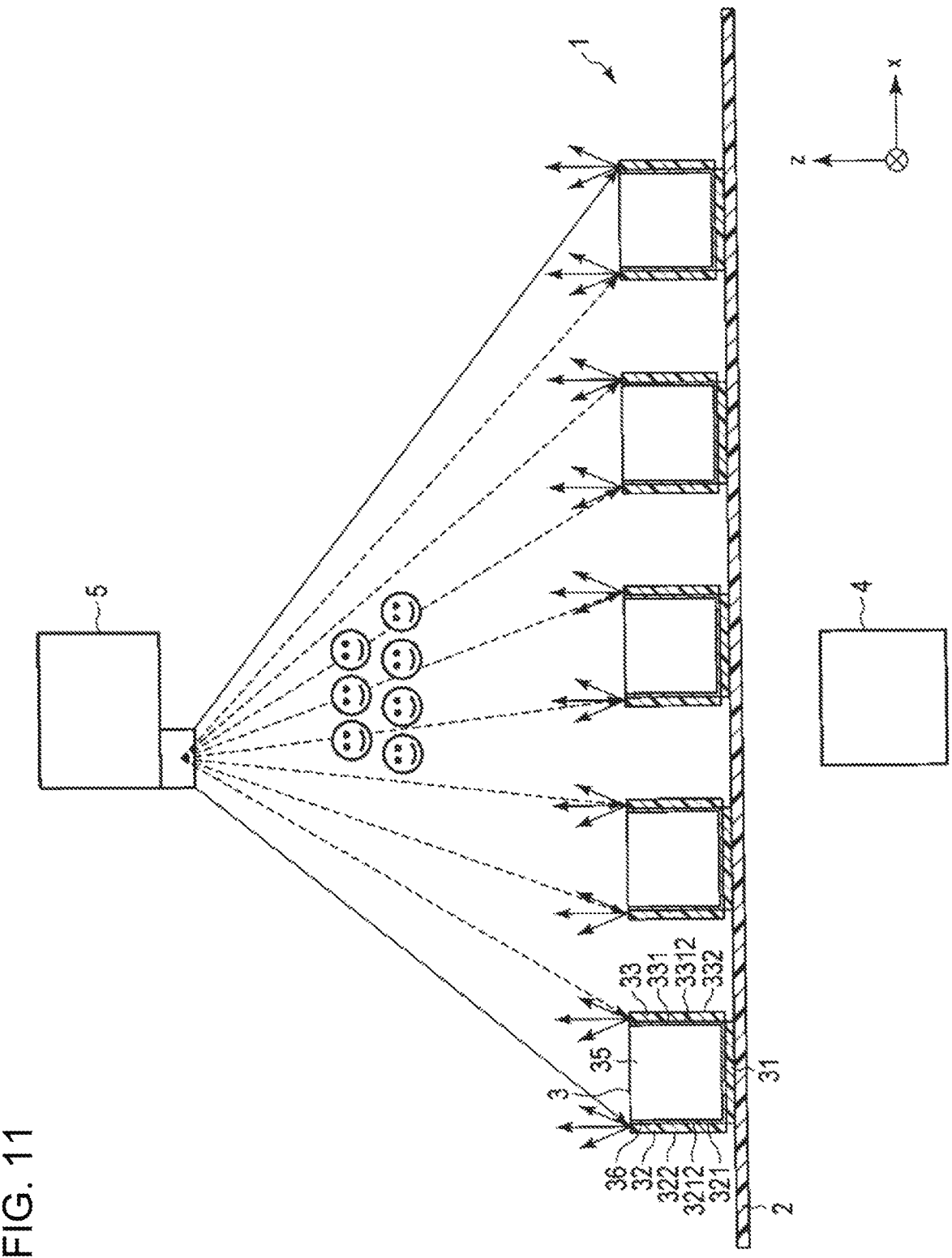
FIG. 11 is a cross-sectional view of an optical element according to a third embodiment.

FIG. 11 is an A-A cross-sectional view of the optical element 1 shown in FIG. 1.

The structure of each information forming unit 3 is explained based on FIG. 11. The inner surface 321 of the first side surface member 32 is provided with a light diffusion structure 3212 for forming an element of first information. The inner surface 331 of the second side surface member 33 is provided with a light diffusion structure 3312 for forming an element of second information. The inner surface 341 of the third side surface member 34 is provided with a diffusion structure for forming an element of third information. The inner surface 351 of the fourth side surface member 35 is provided with a diffusion structure for forming an element of fourth information.

A projection device 5 projects videos on the information forming units 3 configured as described above. For example, the projection device 5 is a projector.

The first information is formed by the light diffusion structure 3212 provided in the inner surface 321. Specifically, the first information is a video from the projection device 5 reflected by the inner surface 321. The second information is formed by the light diffusion structure 3312 provided in the inner surface 331. Specifically, the second information is a video from the projection device 5 reflected by the inner surface 331. The third information is formed by the diffusion structure provided in the inner surface 341. Specifically, the third information is a video from the projection device 5 reflected by the inner surface 341. The fourth information is formed by the diffusion structure provided in the inner surface 351. Specifically, the fourth information is a video from the projection device 5 reflected by the inner surface 351.

In the example shown in FIG. 11, the projection device 5 projects a video on each of the inner surface 321 of the first side surface member 32, the inner surface 331 of the second side surface member 33, the inner surface 341 of the third side surface member 34, and the inner surface 351 of the fourth side surface member 35; thus, the first information to the fourth information are the same information.

According to the third embodiment, the observer can simultaneously see an external object 4 visible through the optical element 1, and the videos formed by the optical element 1, by seeing the optical element 1 along a direction across the z-axis. Furthermore, because the optical element 1 is positioned apart from the object 4, the observer can recognize the object 4 and the videos formed by the optical element 1 as separate pieces of information. Consequently, the observer can obtain a more stereoscopic effect than projection mapping that directly projects videos on the object 4.

As a modified example of the third embodiment, a plurality of projection devices may project different videos on a plurality of inner surfaces provided in each information forming unit 3. For example, a first video is projected by a first projection device on at least one of the inner surface 321, the inner surface 331, the inner surface 341, and the inner surface 351. A second video different from the first video is projected by a second projection device on at least one inner surface other than the inner surface on which the video is projected by the first projection device.

According to the modified example, the observer can see a plurality of videos, with suitable selection, by changing the angle or direction in which the observer views the optical element 1.

Fourth Embodiment

Next, the fourth embodiment is explained. The fourth embodiment is different from the first embodiment in the following respect. The information forming units 3 each include displays, in place of the printed images.

Figure 12:
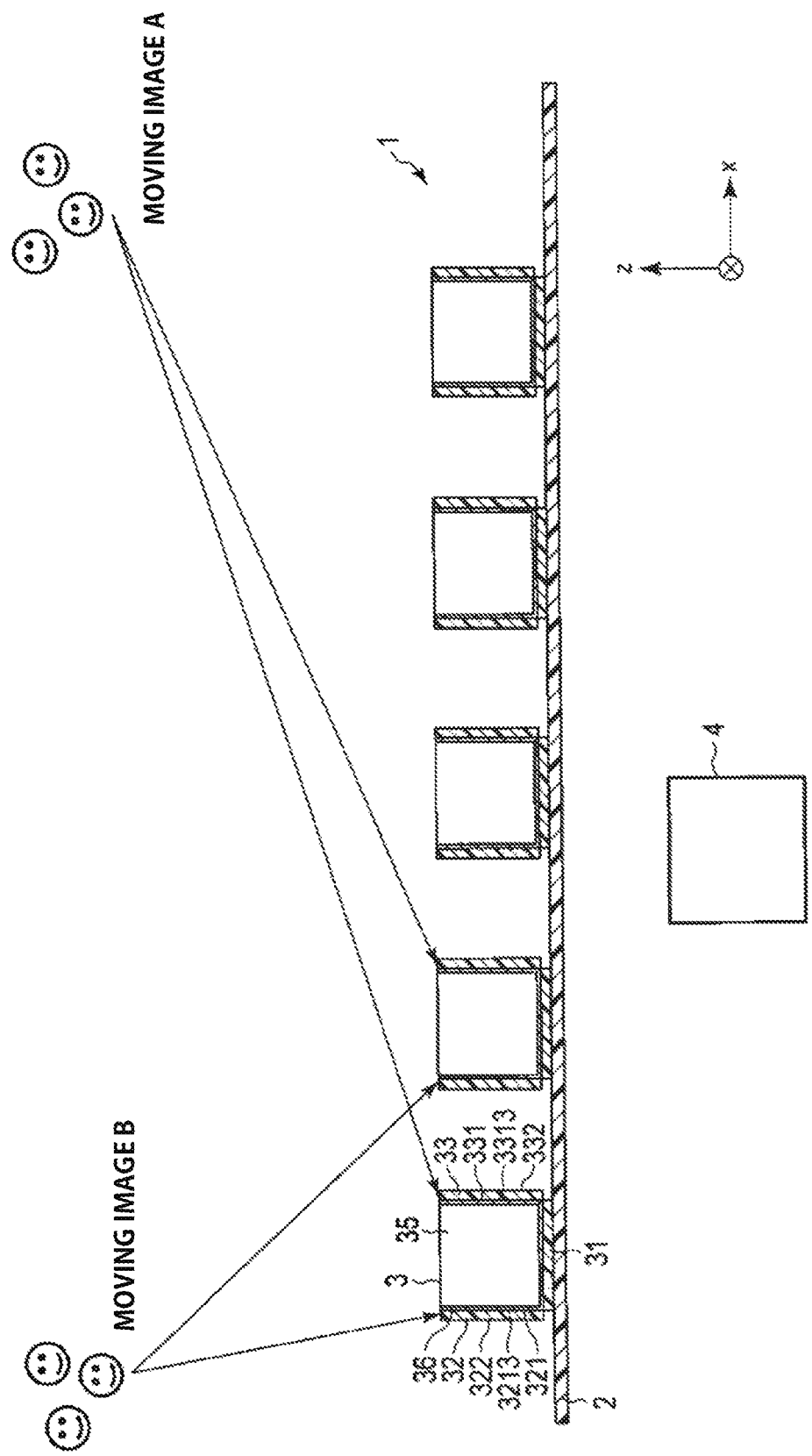
FIG. 12 is a cross-sectional view of an optical element according to a fourth embodiment.

FIG. 12 is an A-A cross-sectional view of the optical element 1 shown in FIG. 1.

The structure of each information forming unit 3 is explained based on FIG. 12. The inner surface 321 of the first side surface member 32 is provided with a display 3213 for forming an element of first information. The display 3213 is, for example, a liquid crystal display, an organic EL (electroluminescence) display, a light-emitting device such as LED (light-emitting diode), or the like. The inner surface 331 of the second side surface member 33 is provided with a display 3313 for forming an element of second information. The inner surface 341 of the third side surface member 34 is provided with a display, which is the same as the display 3213, for forming an element of third information. The inner surface 351 of the fourth side surface member 35 is provided with a display, which is the same as the display 3213, for forming an element of fourth information.

The first information is formed by the display 3213 provided in the inner surface 321. Specifically, the first information is a moving image displayed on the display 3213. The second information is formed by the display 3313 provided in the inner surface 331. Specifically, the second information is a moving image displayed on the display 3313. The third information is formed by the display provided in the inner surface 341. Specifically, the third information is a moving image displayed on the display provided in the inner surface 341. The fourth information is formed by the display provided in the inner surface 351. Specifically, the fourth information is a moving image displayed on the display provided in the inner surface 351.

The above displays may display moving images for stereoscopic vision in a time-division manner. The observer can thereby see moving images three-dimensionally.

According to the fourth embodiment, the observer can simultaneously see an external object 4 visible through the optical element 1, and the moving images formed by the optical element 1, by viewing the optical element 1 along a direction across the z-axis. Furthermore, because the optical element 1 is positioned apart from the object 4, the observer can recognize the object 4 and the moving images provided by the optical element 1 as separate pieces of information.

As shown in FIG. 12, the plurality of displays provided in each information forming unit 3 may simultaneously display different moving images. For example, the display 3313 displays a moving image A. The display 3213 displays a moving image B.

According to this example, the observer can see a plurality of moving images, with suitable selection, by changing the angle or direction in which the observer views the optical element 1.

Fifth Embodiment

Next, the fifth embodiment is explained. The fifth embodiment is different from the first embodiment in the following respect. The information forming units 3 each include a structure that controls the amplitude or phase of light, in place of the printed images.

Figure 13:
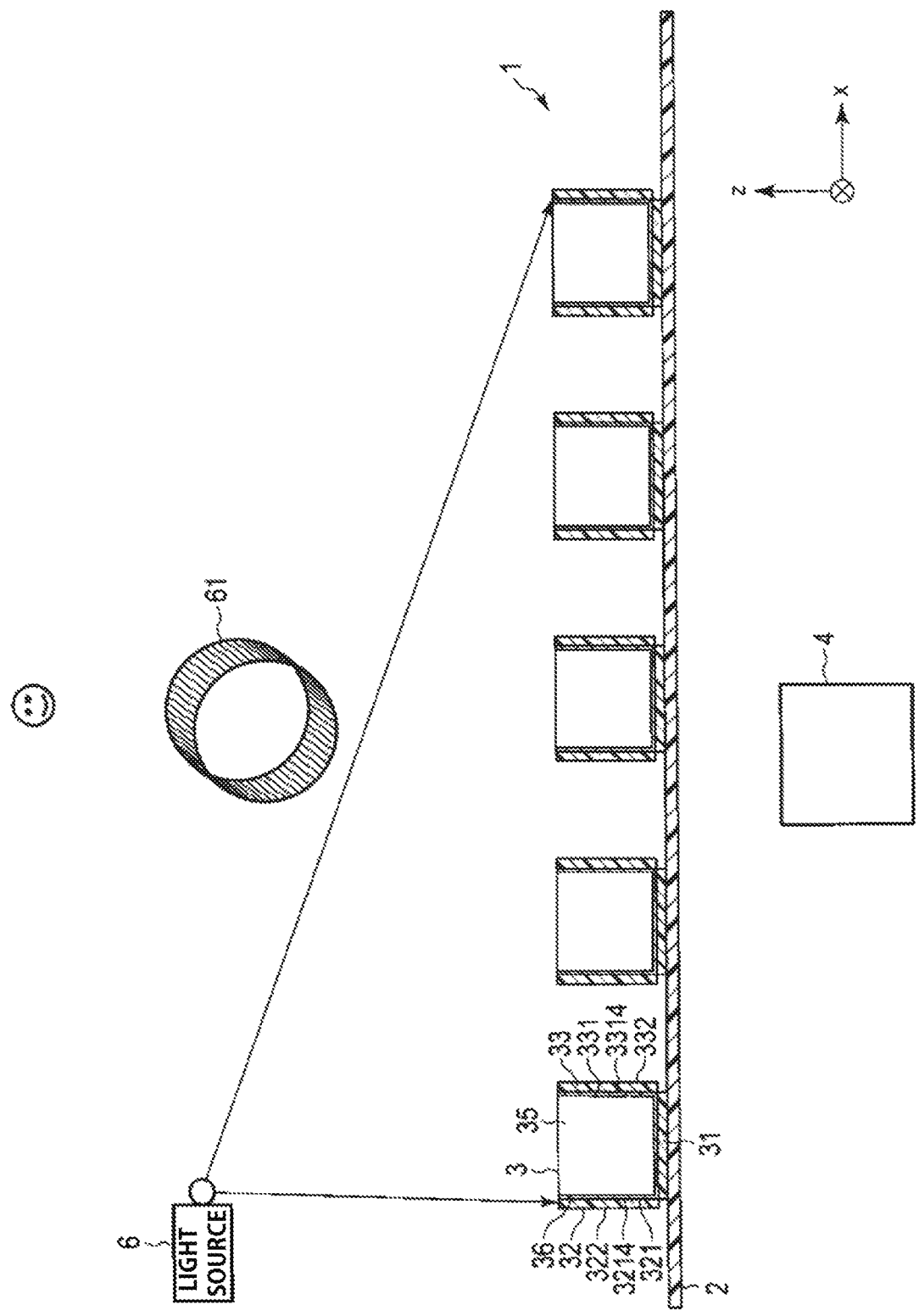
FIG. 13 is a cross-sectional view of an optical element according to a fifth embodiment.

FIG. 13 is an A-A cross-sectional view of the optical element 1 shown in FIG. 1.

The structure of each information forming unit 3 is explained. The inner surface 321 of the first side surface member 32 is provided with a structure 3214 that controls the amplitude or phase of light for forming an element of first information. The inner surface 331 of the second side surface member 33 is provided with a structure 3314, which is the same as the structure 3214, for forming an element of second information. The inner surface 341 of the third side surface member 34 is also provided with a structure, which is the same as the structure 3214, for forming an element of third information. The inner surface 351 of the fourth side surface member 35 is also provided with a structure, which is the same as the structure 3214, for forming an element of fourth information.

A light source 6 irradiates light on the plurality of information forming units 3.

The first information is a reproduced image 61 formed by the above structure 3214. The reproduced image 61 is, for example, a hologram, kinoform, or the like. The second information is a reproduced image 61 formed by the structure 3314 provided in the inner surface 331. The third information is a reproduced image 61 formed by the structure, which is the same as the structure 3214, provided in the inner surface 341. The fourth information is a reproduced image 61 formed by the structure, which is the same as the structure 3214, provided in the inner surface 341.

The first information, the second information, the third information, and the fourth information may be the same or different. That is, the structures provided in the inner surface 321, the inner surface 331, the inner surface 341, and the inner surface 351 may be the same or different.

Because interference fringes are recorded on general transmission-type holograms, observers cannot see the other side of the hologram surface. However, according to the fifth embodiment, the observer can simultaneously see an external object 4 visible through the optical element 1, and the reproduced image 61 formed by the optical element 1, by viewing the optical element 1 along a direction across the z-axis. Furthermore, because the optical element 1 is positioned apart from the object 4, the observer can recognize the object 4 and the reproduced image 61 provided by the optical element 1 as separate pieces of information. In addition, the observer can obtain three-dimensional visual effects as if the reproduced image 61 actually floats in the air.

Sixth Embodiment

Next, the sixth embodiment is explained. The sixth embodiment is different from the first embodiment in the following respect. The information forming units 3 each include image-receiving elements, in place of the printed images.

Figure 14A:
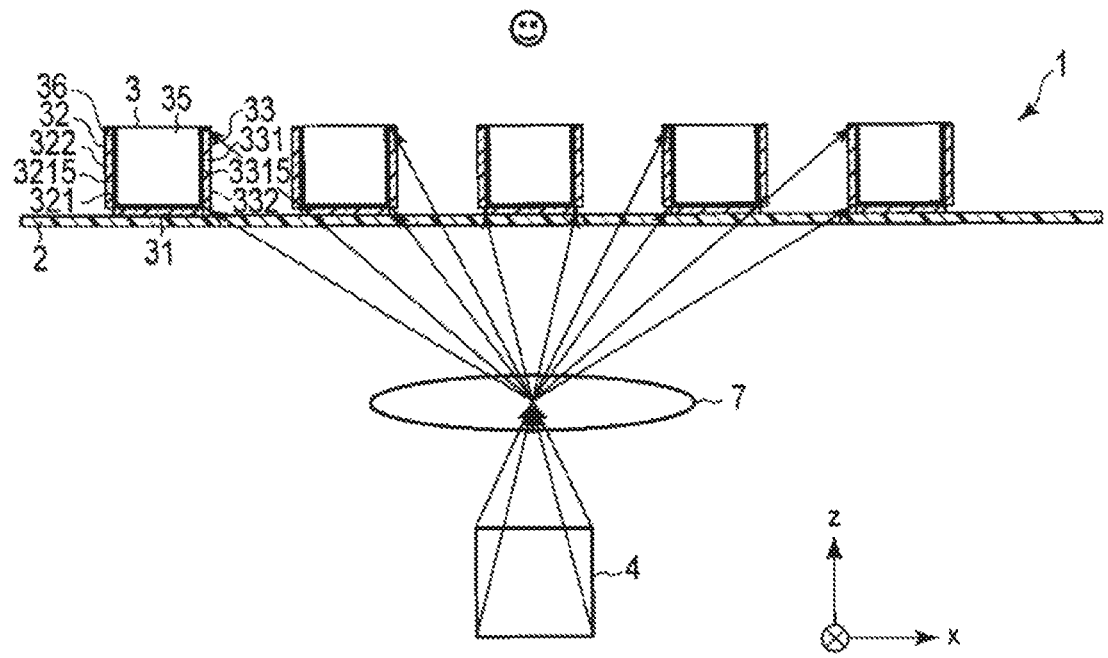
FIG. 14A is a plan view of an optical element according to a sixth embodiment.

FIG. 14A is an A-A cross-sectional view of the optical element 1 shown in FIG. 1.

The structure of each information forming unit 3 is explained based on FIG. 14A. The inner surface 321 of the first side surface member 32 is provided with one or more image-receiving elements 3215 for forming an element of first information. The inner surface 331 of the second side surface member 33 is provided with one or more image-receiving elements 3315 for forming an element of second information. The inner surface 341 of the third side surface member 34 is provided with one or more image-receiving elements, which are the same as the image-receiving element(s) 3215, for forming an element of third information. The inner surface 351 of the fourth side surface member 35 is provided with one or more image-receiving elements, which are the same as the image-receiving element(s) 3215, for forming an element of fourth information.

A plurality of image-receiving elements provided in the information forming units 3 incorporates static images or moving images of an object 4 through an imaging lens 7 placed between the optical element 1 and the object 4.

The first information is formed by the image-receiving element(s) 3215 provided in the inner surface 321. Specifically, the first information is an image of the object 4 incorporated into the image-receiving element(s) 3215. The second information is formed by the image-receiving element(s) 3315 provided in the inner surface 331. Specifically, the second information is an image of the object 4 incorporated into the image-receiving element(s) 3315. The third information is formed by the image-receiving element(s) provided in the inner surface 341. Specifically, the third information is an image incorporated into the image-receiving element(s) provided in the inner surface 341. The fourth information is formed by the image-receiving element(s) provided in the inner surface 351. Specifically, the fourth information is an image incorporated into the image-receiving element(s) provided in the inner surface 351.

Figure 14B:
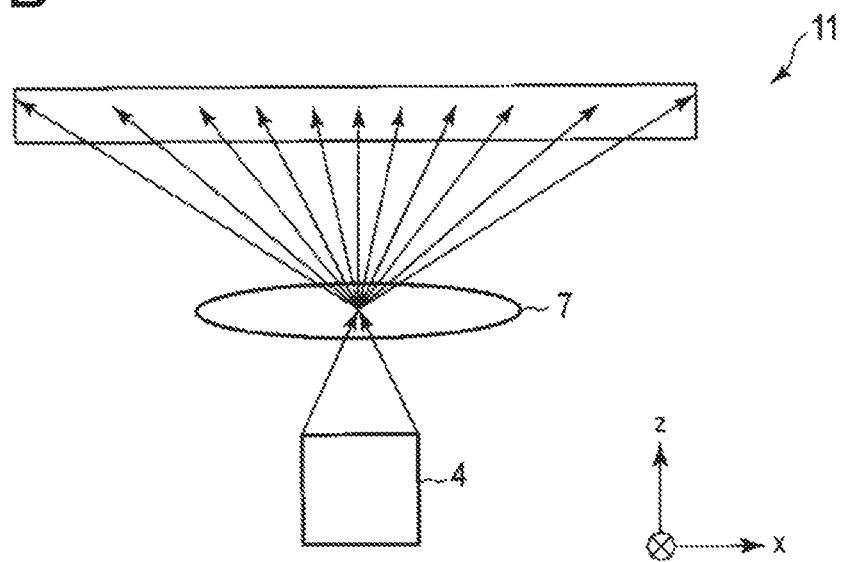
FIG. 14B is a plan view of an optical element according to the sixth embodiment.

FIG. 14B shows an optical element 11 as a comparative example. The optical element 11 includes a plurality of image-receiving elements on a flat surface. The optical element 11 incorporates static images or moving images of an object 4 through an imaging lens 7 placed between the optical element 11 and the object 4.

The optical element 1 according to the sixth embodiment and the optical element 11 as a comparative example are compared.

Different from the optical element 11, the optical element 1 includes image-receiving elements on surfaces vertical to the substrate 2 opposite to the object 4. Even when an image of the object 4 with a large angle is incorporated, the size of the entire optical element 1 can be made compact, compared with the optical element 11. Furthermore, different from the optical element 11, the optical element 1 can incorporate not only an image in front of the object 4 viewed from the optical element 1, but also a depth image of the object 4. Therefore, the optical element 1 can obtain images viewed more three-dimensionally, as compared with the optical element 11.

The area of the surface of the optical element 1 provided with image-receiving elements is larger than that of the optical element 11. Accordingly, the optical element 1 can increase the resolution of images to be incorporated, as compared with the optical element 11.

As a modified example of the sixth embodiment, the images incorporated by the optical element 1 may be used in the above third embodiment or fourth embodiment. That is, the images incorporated by the optical element according to the sixth embodiment are projected on the optical element according to the third embodiment by the projection device 5. Similarly, the images incorporated by the optical element according to the sixth embodiment are displayed on the displays provided in the optical element according to the fourth embodiment. The observer can see three-dimensional images by the optical element according to the third embodiment or fourth embodiment.

Seventh Embodiment

Next, the seventh embodiment is explained. The seventh embodiment relates to a use mode of the optical element 1.

The optical element 1 is bendable.

Figure 15:
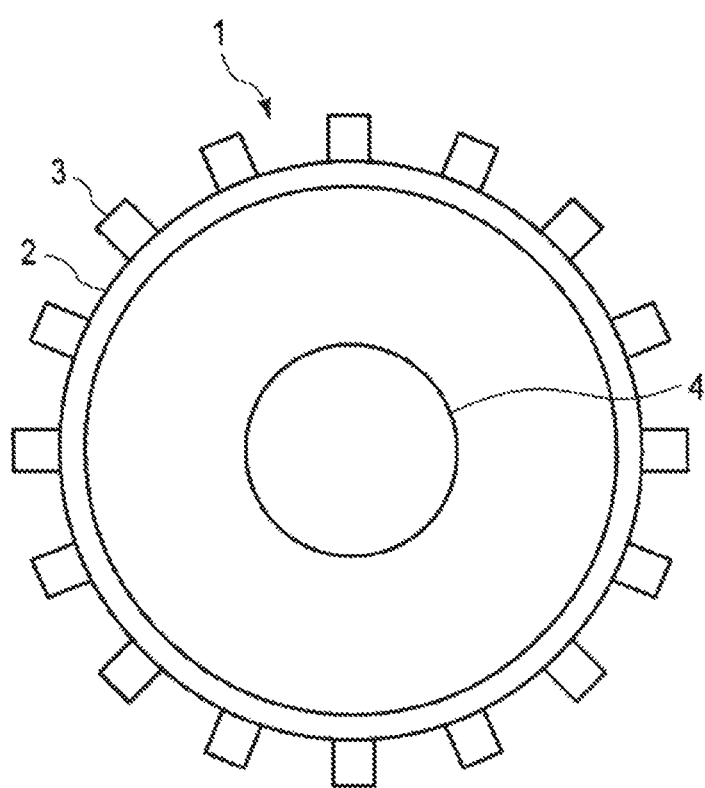
FIG. 15 is a view of an optical element according to a seventh embodiment.

FIG. 15 is a plan view of the optical element 1 formed in a cylindrical shape. The optical element 1 is placed so that the second plane 22 of the substrate 2 of the optical element 1 surrounds an object 4. Thus, the optical element 1 can be placed, for example, along the cylindrical surface of a column or the like. The optical element 1 may be maintained in a state bent into other shapes.

According to the seventh embodiment, the optical element 1 can be placed after being deformed into various shapes in accordance with the shape etc. of the object 4. The observer can see the object 4 from multiple directions through the optical element 1.

Eighth Embodiment

Figure 16A:
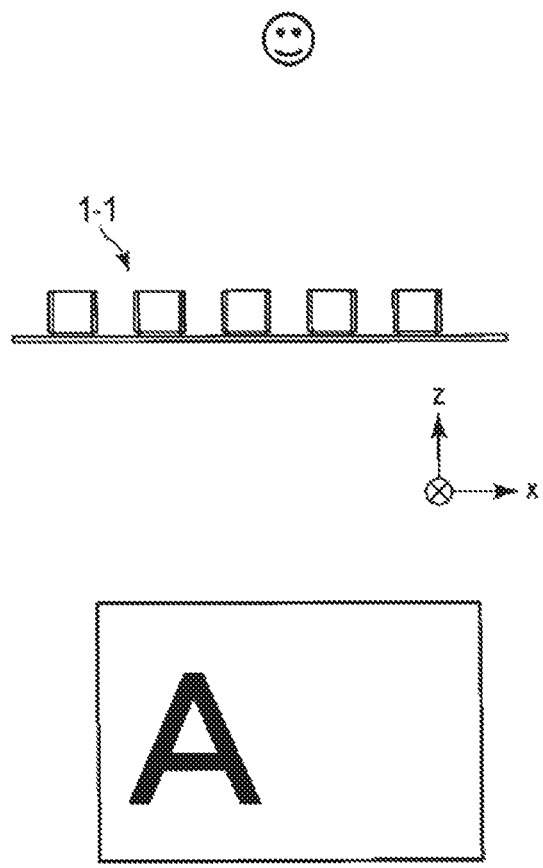
FIG. 16A is a view of an optical element device according to an eighth embodiment.
Figure 16B:
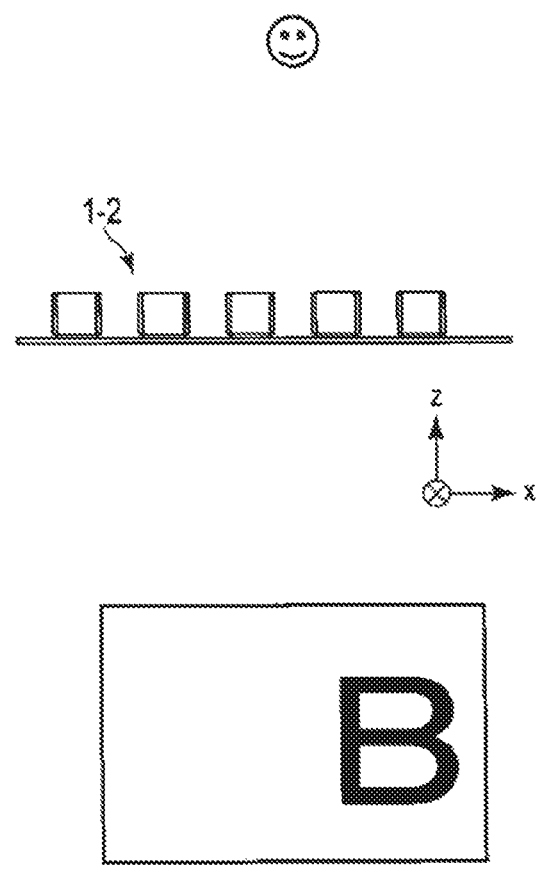
FIG. 16B is a view of the optical element device according to the eighth embodiment.
Figure 16C:
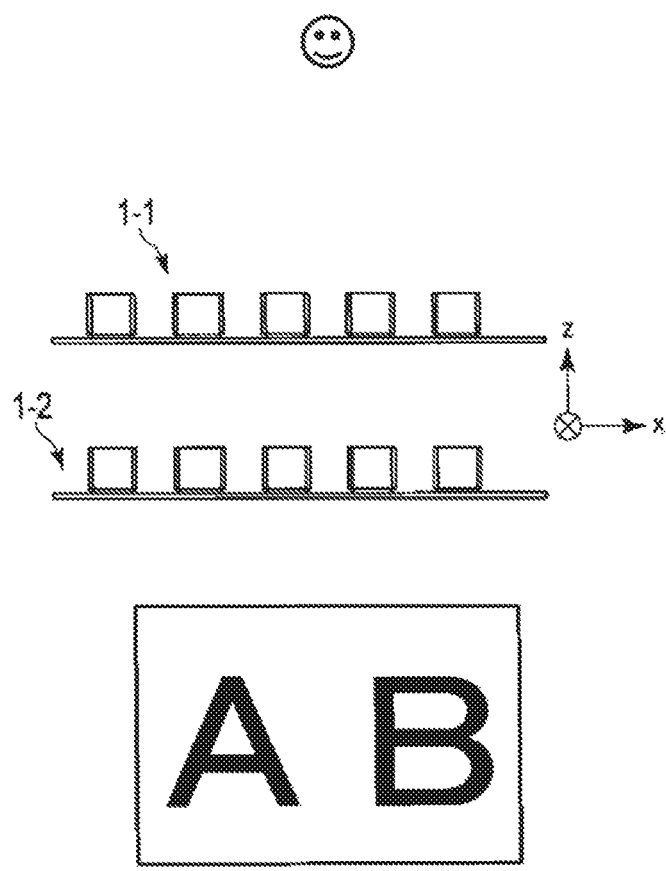
FIG. 16C is a view of the optical element device according to the eighth embodiment.

Next, the eighth embodiment is explained. The eighth embodiment relates to an optical element device. FIGS. 16A to 16C are views explaining the optical element device.

The optical element device includes a first optical element 1-1 and a second optical element 1-2 each corresponding to the optical element explained in the above first embodiment. As shown in FIG. 16C, the first optical element 1-1 is opposite to the second optical element 1-2 along the z-axis.

FIG. 16A is a view only relating to the first optical element 1-1 as a comparative example. In FIG. 16A, the upper row shows a plan view of the first optical element 1-1 viewed along the y-axis, and the lower row shows information that can be obtained by the observer from the first optical element 1-1. The observer can obtain information on the alphabetic character A from the first optical element 1-1.

FIG. 16B is a view only relating to the second optical element 1-2 as a comparative example. In FIG. 16B, the upper row shows a plan view of the second optical element 1-2 viewed along the y-axis, and the lower row shows information that can be obtained by the observer from the second optical element 1-2. The observer can obtain information on the alphabetic character B from the second optical element 1-2.

In FIG. 16C, the upper row shows a plan view of the optical element device including the first optical element 1-1 and the second optical element 1-2 viewed along the y-axis, and the lower row shows information that can be obtained by the observer from both the first optical element 1-1 and the second optical element 1-2. The observer can simultaneously obtain the information on the alphabetic character A and the information on the alphabetic character B from the first optical element 1-1 and the second optical element 1-2. The first optical element 1-1 and the second optical element 1-2 are arranged so that the information on the alphabetic character A and the information on the alphabetic character B that can be obtained by the observer do not overlap with each other.

According to the eighth embodiment, the observer can simultaneously see information from each of a plurality of optical elements provided in the optical element device. Furthermore, because the optical elements provided in the optical element device are arranged at predetermined intervals, the observer can grasp information from each of the plurality of optical elements as three-dimensional information with a feeling of depth.

The optical element device may use the optical elements explained in the above second to seventh embodiments.

Ninth Embodiment

Next, the ninth embodiment is explained. The ninth embodiment relates to an optical element control system.

Figure 17:
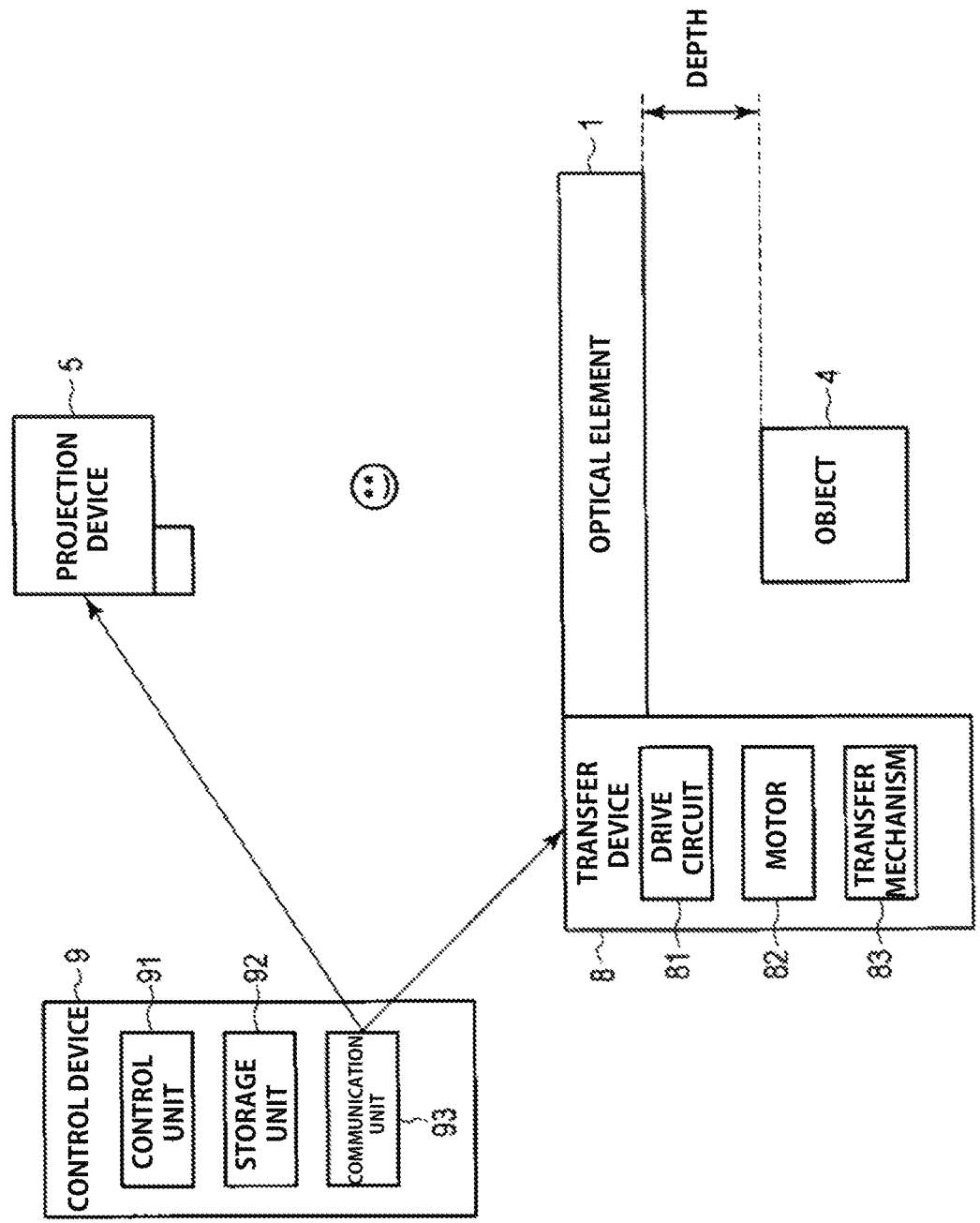
FIG. 17 is a view of an optical element control system according to a ninth embodiment.

FIG. 17 shows the optical element control system. The optical element control system includes the optical element 1 according to the above third embodiment, a transfer device 8, and a control device 9.

The transfer device 8 is a device for transferring the optical element 1. The transfer device 8 includes a drive circuit 81, a motor 82, and a transfer mechanism 83. The drive circuit 81 controls the motor 82 based on control by the control device 9. The motor 82 is connected to the transfer mechanism 83. The motor 82 transmits dynamic force to the transfer mechanism 83. The transfer mechanism 83 is attached to the optical element 1. The transfer mechanism 83 transfers the optical element 1. The transfer mechanism 83 may be, for example, a roller, or a slider movable along a guide, but is not limited thereto.

Due to the above structure, the transfer device 8 can move the optical element 1 by any direction and angle. For example, the transfer device 8 can adjust the distance (depth) between the optical element 1 and an object 4. For example, the transfer device 8 can slide the optical element 1 in a transverse direction, while keeping the distance (depth) between the optical element 1 and the object 4. For example, the transfer device 8 can also incline the optical element 1.

The control device 9 controls the operation of the transfer device 8. The control device 9 includes a control unit 91, a storage unit 92, and a communication unit 93. The control unit 91 controls the operation of each unit of the control device 9. The storage unit 92 stores various programs and various data. Further, the storage unit 92 stores contents projected from a projection device 5. The communication unit 93 communicates with the projection device 5 and the transfer device 8 by a wire or wirelessly.

The control device 9 may obtain the above programs, data, and contents from the outside through the communication unit 93. In the optical element control system, the optical element 1, the transfer device 8, and the control device 9 may be provided as separate parts or a single part.

Next, the operation of the control system is explained.

The control unit 91 sends contents to the projection device 5 through the communication unit 93. The projection device 5 thereby projects a video of the contents on the optical element 1.

The control unit 91 sends a signal for controlling the transfer of the optical element 1 by the transfer mechanism 83 to the transfer device 8 through the communication unit 93 in synchronization with the video projected on the optical element 1. The control unit 91 can control the transfer device 8 based on a program stored in the storage unit 92. For example, this program defines the positional relationship between the optical element 1 and the object 4 depending on the scene of the contents. The transfer device 8 transfers the optical element 1 based on control by the control device 9.

Figure 18A:
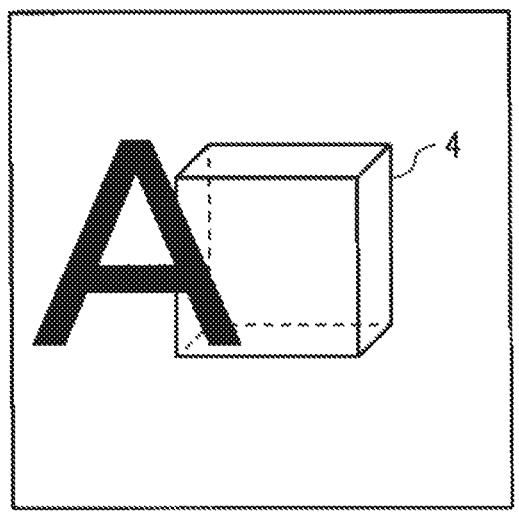
FIG. 18A is a view of information visible by the optical element control system according to the ninth embodiment.
Figure 18B:
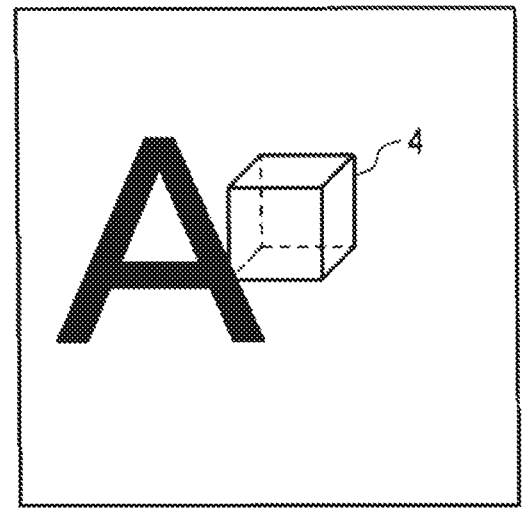
FIG. 18B is a view of information visible by the optical element control system according to the ninth embodiment.

FIGS. 18A and 18B explain information that can be obtained by the observer.

FIG. 18A shows information that can be obtained by the observer when the space between the optical element 1 and the object 4 is narrow. The observer can see information on the alphabetic character A obtained from the optical element 1 in a position close to the object 4.

FIG. 18B shows information that can be obtained by the observer when the space between the optical element 1 and the object 4 is broader than that of FIG. 18A. The observer can see information on the alphabetic character A obtained from the optical element 1 in a position more distant from the object 4 than in FIG. 18A.

According to the ninth embodiment, the optical element control system can control the position of the optical element with respect to the object depending on the video scene. The optical element control system can provide complicated visual effects to the observer. The observer can thereby see three-dimensionally the video and the object that are controlled in a suitable positional relationship depending on the scene, and can obtain complicated visual effects.

The optical element control system may use the optical element explained in the above fourth embodiment. In this case, the control device 9 sends contents to the displays provided in the optical element 1 through the communication unit 93.

The optical element control system may also use the optical elements explained in the above second and fifth to eighth embodiments. In these cases, for example, the control device 9 sends a signal for controlling the transfer of the optical element 1 by the transfer mechanism 83 to the transfer device 8 through the communication unit 93, based on operation by an operator.

Tenth Embodiment

The tenth embodiment relates to a method for producing an optical element 1 applied to the above first to ninth embodiments. Here, a method for producing an optical element 1 including the information forming units 3 shown in FIGS. 7A and 7B is explained.

Figure 19:
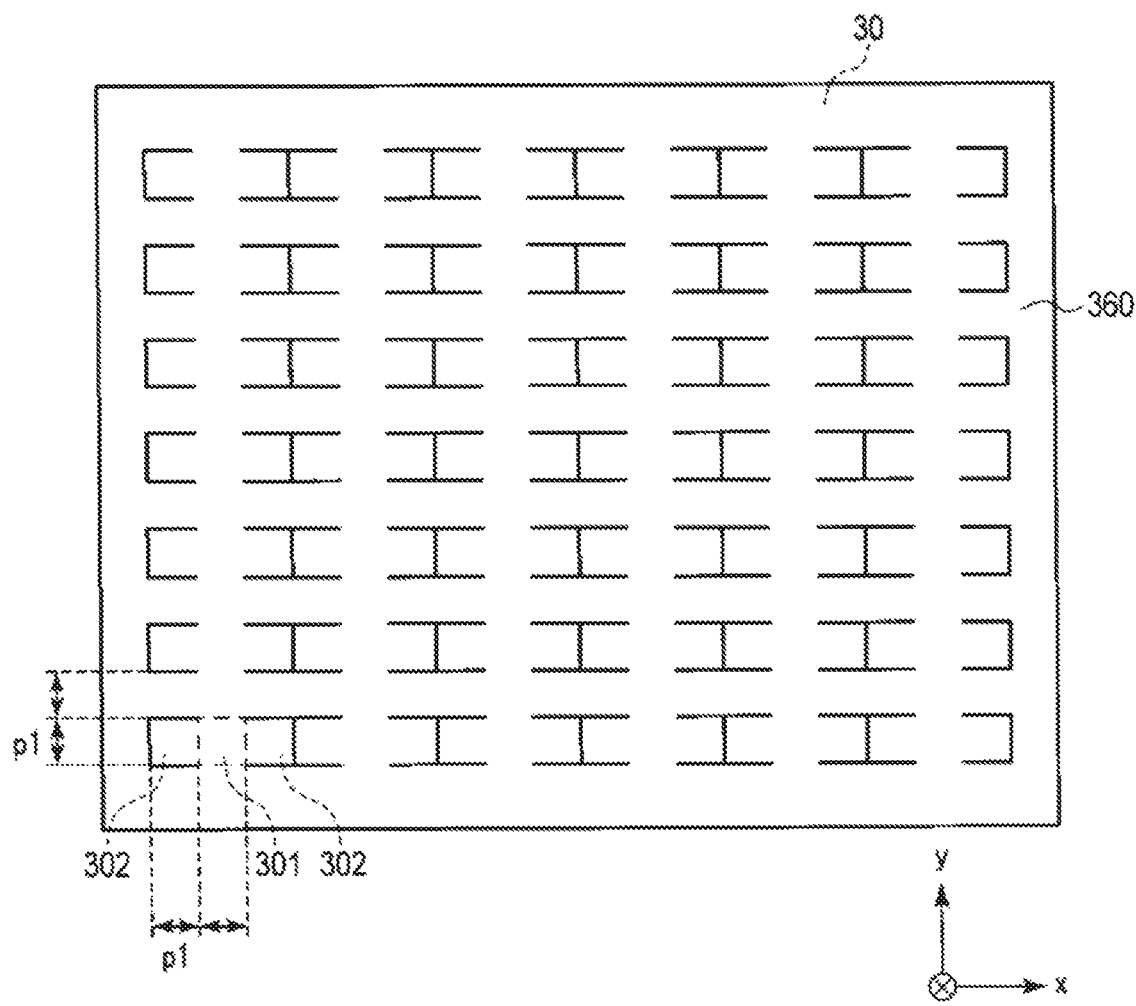
FIG. 19 is a view explaining a method for producing an optical element according to a tenth embodiment.

FIG. 19 is a plan view of the optical element 1 in the production process.

The production method includes a step of forming a transparent body 30 composed of a material having transmissivity on a first plane 21 of a substrate 2 composed of a material having transmissivity. The transparent body 30 is used to form the information forming units 3.

Next, the production method includes a step of providing structures for forming information in the transparent body 30. The structures for forming information correspond to the structures that form information explained in each of the above embodiments. As shown in FIG. 19, the structures for forming information are provided in two second regions 302 adjacent to a first region 301 of the transparent body 30. The first region 301 is not provided with a structure for forming information. The first region 301 corresponds to the bottom surface member 31 of the information forming unit 3. The two second regions 302 correspond to the first side surface member 32 and the second side surface member 33 of the information forming unit 3. A region combining the first region 301 and the two second regions 302 corresponds to the developed view of the information forming unit 3 to be produced. The region combining the first region 301 and the two second regions 302 is placed in plural number in a lattice shape on the transparent body 30. The number of second regions 302 adjacent to the first region 301 depends on the number of side surface members provided in the information forming unit 3 to be produced. It is sufficient for the first region 301 to be adjacent to at least one second region 302.

Next, the production method includes a step of forming a metal film 360 on the transparent body 30.

Next, the production method includes a step of cutting the transparent body 30 and the metal film 360 on the first plane 21 of the substrate 2. The periphery of each second region 302, except for the boundary portion with the first region 301, is cut. The transparent body 30 and the metal film 360 are cut by a laser marker, for example.

Next, the production method includes a step of making the second regions 302 vertical to the first region 301. The second regions 302 become vertical to the first region 301 by an external force.

The optical element 1 is produced by the production method described above.

According to the tenth embodiment, the method for producing an optical element 1 can accurately and easily produce an optical element 1 including a substrate 2 and vertical surfaces by laser beam machining.

Figure 20:
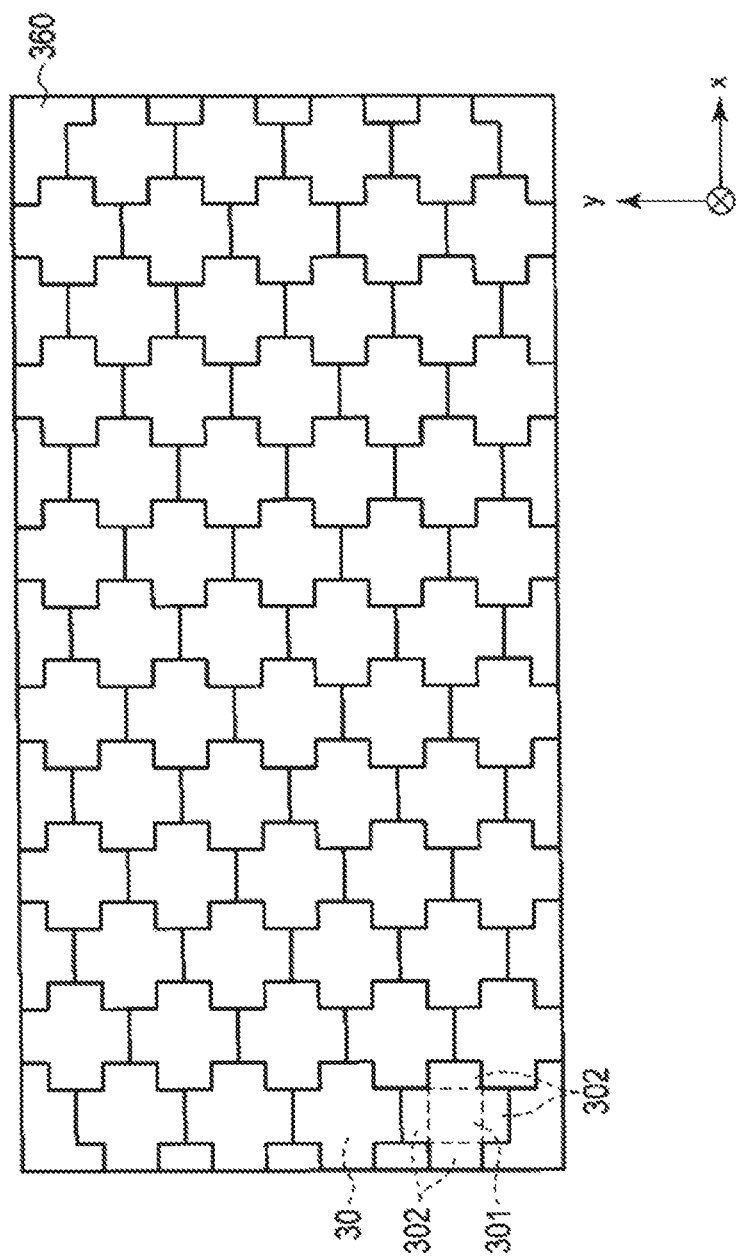
FIG. 20 is a view explaining a method for producing an optical element according to a modified example of the tenth embodiment.

Next, a modified example of the tenth embodiment is explained. FIG. 20 is a plan view of an optical element 1 including the information forming units 3 shown in FIGS. 2A to 2C, in the production process.

In a transparent body 30, a first region 301 is square and adjacent to four second regions 302. The second regions 302 each have a rectangular shape obtained by equally dividing the first region 301 into two parts. The four second regions 302 correspond to the first to fourth side surface members 32 to 35 of the information forming unit 3. Regions combining the first region 301 and the four second regions 302 each have a cross shape. The regions in the cross shape are spread over the transparent body 30. A plurality of first regions 301 is arranged in one line along the Y-axis. Each of a plurality of first regions 301 arranged in a first line is not opposite to each of a plurality of first regions 301 arranged in a second line next to the first line along the X-axis. Each of the plurality of first regions 301 arranged in the first line is opposite to each of a plurality of first regions 301 arranged in a third line on a side opposite to the first line across the second line along the X-axis.

According to this modified example, many information forming units 3 can be provided on the substrate 2. Further, the area of the metal film 360 opposite to the substrate 2 is smaller in the produced optical element 1. Therefore, the substrate 2 has a broader region transmitted in the z-axial direction.

Eleventh Embodiment

The eleventh embodiment relates to a method for producing an optical element 1 applied to the above first to ninth embodiments, the method being different from the tenth embodiment. Here, a method for producing an optical element 1 including the information forming units 3 shown in FIGS. 2A to 2C is explained.

FIGS. 21A to 21E, 22A to 22F, and 23 are views explaining the method for producing the optical element 1.

Figure 21A:
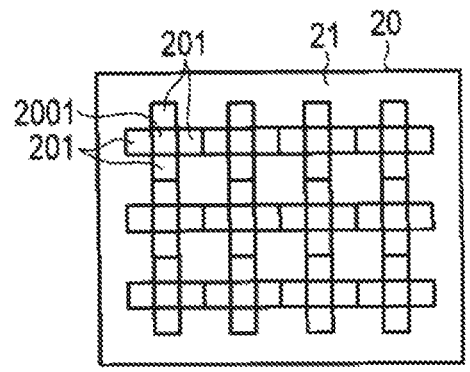
FIG. 21A is a view explaining a method for producing an optical element according to an eleventh embodiment.
Figure 22A:
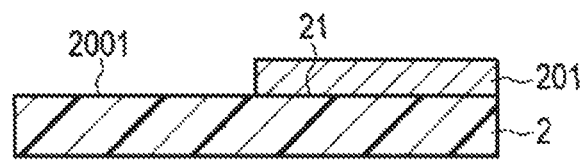
FIG. 22A is a view explaining the method for producing an optical element according to the eleventh embodiment.

First, the production method includes a step of forming metal films 201 partially on a first plane 21 of a substrate 2 composed of a material having transmissivity, as shown in FIGS. 21A and 22A. The regions of the first plane 21 in which the metal films 201 are formed are opposite to regions of a transparent body 300, described later, in which structures 3001 for forming information are provided. The four metal films 201 are adjacent to a rectangular region 2001, in which a metal film 201 is not formed, on the first plane 21.

Figure 21B:
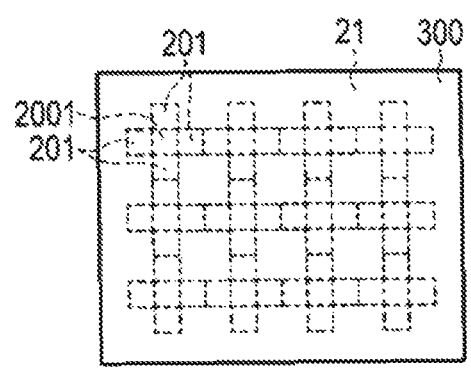
FIG. 21B is a view explaining the method for producing an optical element according to the eleventh embodiment.
Figure 22B:
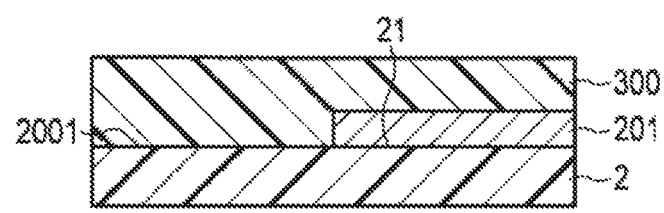
FIG. 22B is a view explaining the method for producing an optical element according to the eleventh embodiment.

Next, the production method includes a step of forming a transparent body 300 composed of a material having transmissivity on the first plane 21 of the substrate 2 and on the metal films 201, as shown in FIGS. 21B and 22B. The transparent body 300 is used to form the information forming units 3.

Figure 21C:
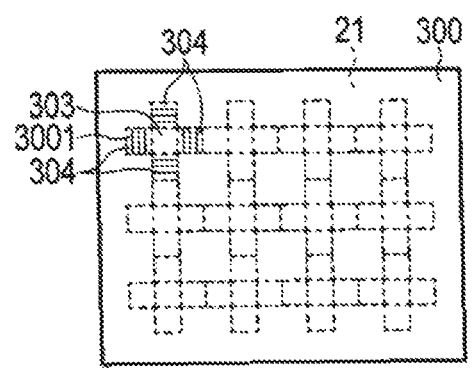
FIG. 21C is a view explaining the method for producing an optical element according to the eleventh embodiment.
Figure 22C:
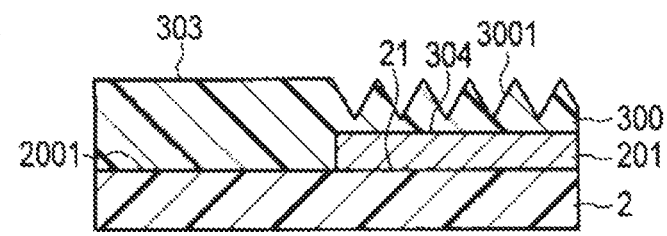
FIG. 22C is a view explaining the method for producing an optical element according to the eleventh embodiment.

Next, the production method includes a step of providing structures 3001 for forming information in the transparent body 300, as shown in FIGS. 21C and 22C. The structures 3001 are provided in four second regions 304 adjacent to a first region 303 of the transparent body 300. The second regions 304 are regions opposite to the metal films 201. The first region 303 is not provided with a structure 3001 because this region is not opposite to the metal film 201. The first region 303 corresponds to the bottom surface member 31 of the information forming unit 3. The four second regions 304 correspond to the first to fourth side surface members 32 to 35 of the information forming unit 3. Regions combining the first region 303 and the four second regions 304 each correspond to the developed view of the information forming unit 3 to be produced. The regions combining the first region 303 and the four second regions 304 are arranged in a lattice shape.

Figure 21D:
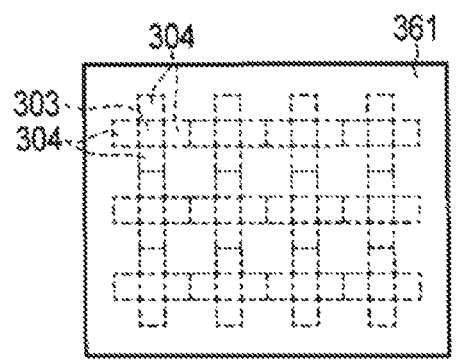
FIG. 21D is a view explaining the method for producing an optical element according to the eleventh embodiment.
Figure 22D:
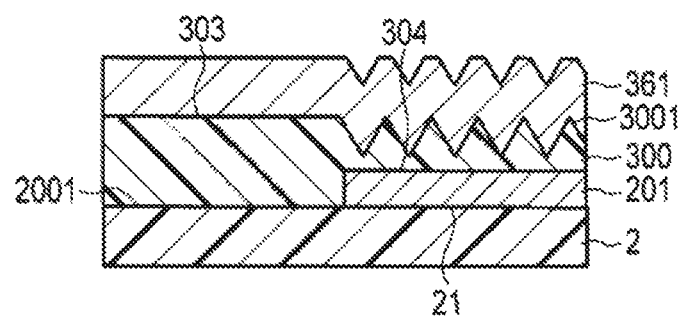
FIG. 22D is a view explaining the method for producing an optical element according to the eleventh embodiment.

Next, the production method includes a step of forming a metal film 361 on the transparent body 300, as shown in FIGS. 21D and 22D.

Figure 21E:
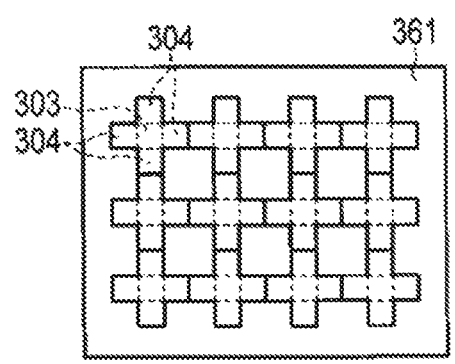
FIG. 21E is a view explaining the method for producing an optical element according to the eleventh embodiment.
Figure 22E:
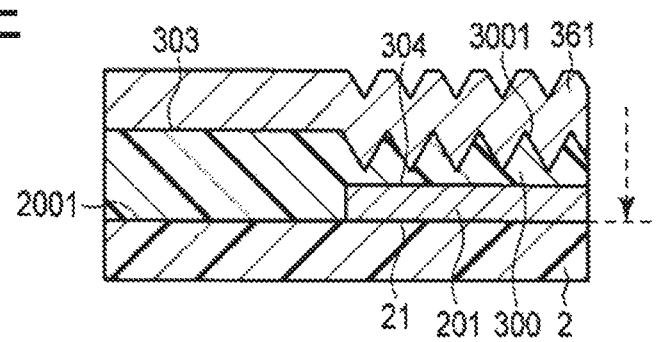
FIG. 22E is a view explaining the method for producing an optical element according to the eleventh embodiment.

Next, the production method includes a step of cutting the transparent body 300 and the metal film 361 on the first plane 21 of the substrate 2, as shown in FIGS. 21E and 22E. The periphery of each second region 304, except for the boundary portion with the first region 303, is cut. The transparent body 300 and the metal film 361 are cut halfway to the surface of the transparent body 300.

Figure 22F:
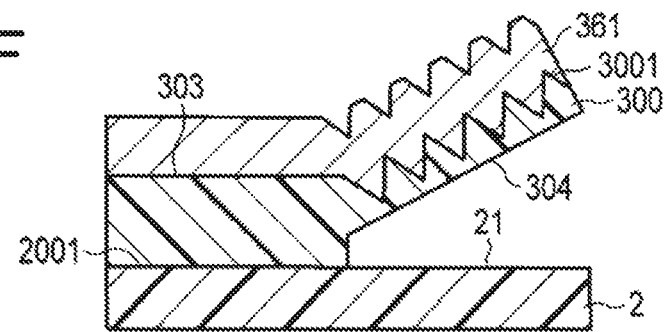
FIG. 22F is a view explaining the method for producing an optical element according to the eleventh embodiment.

Next, the production method includes a step of removing the metal films 201, as shown in FIG. 22F. The metal films 201 are dissolved in a solvent, and removed from the space between the substrate 2 and the transparent body 300.

Figure 23:
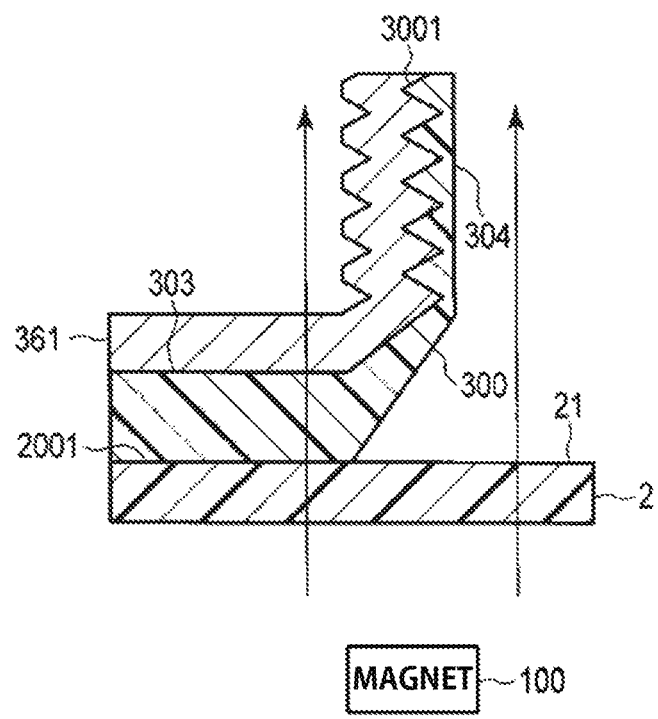
FIG. 23 is a view explaining the method for producing an optical element according to the eleventh embodiment.

Next, the production method includes a step of making the second regions 304 vertical to the first region 303, as shown in FIG. 23. A magnet 100 applies a magnetic field to each second region 304. The second region 304 is oriented by the magnetic field to become vertical to the first region 303.

Moreover, in order to make the second region 304 vertical, a variable magnetic field is applied to thereby generate an induced current by electromagnetic induction in the metal film 201 of the second region 304, and the second region 304 can be oriented vertically due to the repulsion between the magnetic field of the induced current and the applied variable magnetic field.

When a magnetic field in which a vertical direction varies is applied to the metal film 201 as a variable magnetic field, a magnetic field in a direction that cancels the magnetic field applied to the metal film 201 is generated in the metal film 201 due to Lenz's law, and a force vertical to the metal film 201 is generated in the metal film 201. The second region 304 can thereby be vertically oriented.

Even when metal that is not magnetized is used as the metal film 201, the second regions 304 can be oriented vertically by a variable magnetic field. Aluminum, copper, tin, or zinc can be used as the unmagnetized metal. Moreover, a metal compound can also be used as the metal film 201. The metal compound can be a conductive metal compound. ITO or ZnO can be used as the conductive metal compound.

The optical element 1 is produced by the production method described above. According to the eleventh embodiment, the method for producing an optical element 1 can accurately and easily produce an optical element 1 including a substrate 2 and vertical surfaces.

The method for producing an optical element 1 is described below while providing specific Examples. Needless to say, the method for producing an optical element 1 is not limited to the following Examples, and includes other production methods including steps that can be analogized by a person skilled in the art.

Example 1

An example of the production method explained in the above tenth embodiment is explained with reference to FIG. 19.

First, a UV-curable resin, which served as the transparent body 30, was formed on a PET substrate, which served as the substrate 2. Irregular shapes (diffraction gratings) were formed on the UV-curable resin. An irregular shape with a pitch of 400 nm was formed in the second region 302 adjacent to one side of the first region 301 shown in FIG. 19. The irregular shape with a pitch of 400 nm forms first information. An irregular shape with a pitch of 600 nm was formed in another second region 302 adjacent to the other side of the first region 301. The irregular shape with a pitch of 600 nm forms second information. As for the irregular shapes, a pattern drawn on a resist by an electron beam lithography system was developed, Ni was sputtered on the surface thereof, and Ni electroforming was performed. A Ni-electroformed plate was wound around a cylinder, and irregular shapes were formed on the UV-curable resin by a roll-to-roll process.

Next, aluminum was deposited to a thickness of 100 nm on the surface of the UV-curable resin.

Next, the laminate of the PET substrate, UV-curable resin, and aluminum was cut into a 100-mm square, and the UV-curable resin and aluminum on the PET substrate were cut by a laser marker (produced by Keyence Corporation), as shown in FIG. 19. Each side (p1) of the respective second regions 302 was set to 1 mm.

Next, the two second regions 302 in which irregular shapes were formed were each bent perpendicularly to the first region 301.

Next, a resin with a thickness of about 1 mm was formed in the bent portions.

An optical element as a sample was produced by the above steps.

An observer was able to confirm the first information or the second information, while visually recognizing external information transmitted through the optical element, by changing the angle or direction in which the observer viewed the optical element.

Example 2

An example of the production method explained in the above eleventh embodiment is explained with reference to FIGS. 21A to 21E, 22A to 22F, and 23.

First, as shown in FIGS. 21A and 22A, aluminum, which served as the metal film 201, was partially formed on a PET substrate, which served as the substrate 2. The thickness of the aluminum was set to 100 nm.

Next, as shown in FIGS. 21B and 22B, a UV-curable resin was formed on the PET substrate and aluminum.

Next, as shown in FIGS. 21C and 22C, irregular shapes were formed on the UV-curable resin.

Next, as shown in FIGS. 21D and 22D, nickel was deposited to a thickness of 200 nm on the UV-curable resin.

Next, as shown in FIGS. 21E and 22E, halfway cutting was performed to the surface of the PET substrate in contact with the UV-curable resin.

Next, as shown in FIG. 21F, the aluminum was dissolved in 5% sodium hydroxide. Thereafter, the surface was coated with a UV resin.

Next, as shown in FIG. 23, a magnetic field was generated using a magnet 100, and the nickel was allowed to react to the magnetic field. The second region 304 in which an irregular shape was formed on the UV-curable resin was thereby made vertical to the first region 303 in which an irregular shape was not formed. The UV-curable resin was cured in this state.

As for the irregular shapes, a pattern drawn on a resist by an electron beam lithography system was developed, Ni was sputtered on the surface thereof, and Ni electroforming was performed. A Ni-electroformed plate was wound around a cylinder, and irregular shapes were formed by a roll-to-roll process. The pitches of the irregular shapes formed in the four second regions 304 were 400 nm, 500 nm, 600 nm, and 700 nm.

An optical element as a sample was produced by the above steps.

An observer was able to confirm first information, second information, third information, or fourth information, while visually recognizing external information transmitted through the optical element, by changing the angle or direction in which the observer viewed the optical element.

Example 3

An optical element 1 was produced according to the production method explained in the above eleventh embodiment. Different from Example 2, picture patterns were printed on the UV-curable resin in Example 3. Different picture patterns were printed on the four second regions 304 shown in FIGS. 21A to 21E. Other steps are the same as those of Example 2.

An observer was able to confirm first information, second information, third information, or fourth information, which were picture patterns, while visually recognizing external information transmitted through the optical element, by changing the angle or direction in which the observer viewed the optical element.

Example 4

An optical element 1 was produced according to the production method explained in the above eleventh embodiment. Example 4 is different from Example 2 in terms of the method for forming irregular shapes. Other steps are the same as those of Example 2. As for the irregular shapes, a computer-generated hologram (hereinafter, referred to as CGH) was previously calculated, a pattern drawn on a resist by an electron beam lithography system was developed, Ni was sputtered on the surface thereof, and Ni electroforming was performed. The calculation of CGH was performed in advance so that reproduced images were reproduced in a state in which the second regions 304 shown in FIGS. 21A to 21E stood vertically to the first region 303. A Ni-electroformed plate was wound around a cylinder, and irregular shapes were formed by a roll-to-roll process.

An observer was able to confirm first information, second information, third information, or fourth information, which were reproduced images, while visually recognizing external information transmitted through the optical element, by changing the angle or direction in which the observer viewed the optical element.

The present invention is not limited to the above embodiments, and various modifications can be applied at the implementation stage within a range that does not depart from the gist of the present invention. Furthermore, the above embodiments include inventions at various stages, and various inventions can be extracted by suitable combinations of a plurality of structural elements disclosed herein.

For example, even if some structural elements are deleted from all the structural elements disclosed in the embodiments, a structure from which these structural elements are deleted can be extracted as an invention as long as the problems described in the section "Technical Problem" can be solved, and the effects described in "Advantageous Effects of the Invention" can be obtained.

[Reference Signs List] 1 . . . Optical element, 1-1 . . . First optical element, 1-2 . . . Second optical element, 2 . . . Substrate, 3 . . . Information forming unit, 4 . . . Object, 5 . . . Projection device, 6 . . . Light source, 7 . . . Imaging lens, 8 . . . Transfer device, 9 . . . Control device, 11 . . . Optical element, 21 . . . First plane, 22 . . . Second plane, 30 . . . Transparent body, 31 . . . Bottom surface member, 32 . . . First side surface member, 33 . . . Second side surface member, 34 . . . Third side surface member, 35 . . . Fourth side surface member, 36 . . . Metal film, 61 . . . Reproduced image, 81 . . . Drive circuit, 82 . . . Motor, 83 . . . Transfer mechanism, 91 . . . Control unit, 92 . . . Storage unit, 93 . . . Communication unit, 100 . . . Magnet, 201 . . . Metal film, 300 . . . Transparent body, 301 . . . First region, 302 . . . Second region, 303 . . . First region, 304 . . . Second region, 311 . . . Inner surface, 312 . . . Outer surface, 321 . . . Inner surface, 322 . . . Outer surface, 331 . . . Inner surface, 332 . . . Outer surface, 341 . . . Inner surface, 342 . . . Outer surface, 351 . . . Inner surface, 352 . . . Outer surface, 360 . . . Metal film, 361 . . . Metal film, 2001 . . . Region, 3001 . . . Structure, 3211 . . . Diffraction grating, 3212 . . . Light diffusion structure, 3213 . . . Display, 3214 . . . Structure, 3215 . . . Image-receiving element, 3311 . . . Diffraction grating, 3312 . . . Light diffusion structure, 3313 . . . Display, 3314 . . . Structure, 3315 . . . Image-receiving element, 3411 . . . Diffraction grating, 3511 . . . Diffraction grating

What is claimed is:

1. A transmission-type optical element having transmissivity in a first direction, the optical element comprising:
a transparent substrate having a first plane and a second plane, which is opposite to the first plane;
a plurality of information forming units on the first plane of the substrate, each having a first surface that forms an element of first information formed by the plurality of information forming units; and
the first surface facing a second direction orthogonal to the first direction, wherein the optical element simultaneously provides an external information visible through the optical element and the first information, wherein each of the plurality of information forming units has a second surface that forms an element of second information formed by the plurality of information forming units, the second surface facing a third direction that is orthogonal to the first direction and different from the second direction and wherein each of the plurality of information forming units has a third surface that forms an element of third information formed by the plurality of information forming units, the third surface facing a fourth direction that is orthogonal to the first direction and different from the second direction.

2. The optical element of claim 1, wherein the first information is formed by an image printed on the first surface.

3. The optical element of claim 1, wherein the first information is formed by a diffraction grating provided on the first surface.

4. The optical element of claim 1, wherein the first information is formed by a structure for diffusing light provided on the first surface.

5. An optical element control system comprising:
the optical element of claim 4;
a transfer mechanism for transferring the optical element; and
a control unit for controlling the transfer of the optical element by the transfer mechanism in synchronization with a video on the first surface, wherein the control unit is configured to send contents to a projection device through a communication unit, thereby the projection device projects a video of the contents on the optical element;
the control unit is configured to send a signal that controls the transfer of the optical element by the transfer mechanism to a transfer device through the communication unit in synchronization with the video projected on the optical element, and,
the control unit is configured to control the transfer device based on a program stored in a storage unit; and the transfer device is configured to transfer the optical elements based on the control by the control unit.

6. The optical element of claim 1, wherein the first information is formed by a display provided on the first surface.

7. The optical element of claim 1, wherein the first information is formed by a structure provided on the first surface for controlling the amplitude or phase of light.

8. The optical element of claim 1, wherein the first information is formed by an image-receiving element provided on the first surface.

9. The optical element of claim 1, wherein the optical element is bendable.

10. An optical element device comprising a first optical element and a second optical element, wherein each of the first optical element and the second optical element is an optical element of claim 1.

11. The optical element of claim 1, wherein each of the plurality of information forming units has a fourth surface that forms an element of fourth information formed by the plurality of information forming units, the fourth surface facing a fifth direction that is orthogonal to the first direction and different from the third direction.

* * * * *